(12) United States Patent
Ernst et al.

(10) Patent No.: US 9,047,156 B2
(45) Date of Patent: Jun. 2, 2015

(54) SYSTEM IMAGE CUSTOMIZATION TOOL

(75) Inventors: Erik Ernst, Heartland, MI (US); Dwight A. Tipton, Downers Grove, IL (US); Scott A. Choquette, Kansas City, MO (US)

(73) Assignee: Accenture Global Services Limited, Dublin (IE)

( * ) Notice: Subject to any disclaimer, the term of this patent is extended or adjusted under 35 U.S.C. 154(b) by 671 days.

(21) Appl. No.: 12/836,115

(22) Filed: Jul. 14, 2010

(65) Prior Publication Data

US 2011/0016414 A1 Jan. 20, 2011

Related U.S. Application Data

(60) Provisional application No. 61/225,908, filed on Jul. 15, 2009.

(51) Int. Cl.
*G06F 3/0481* (2013.01)
*G06F 9/445* (2006.01)

(52) U.S. Cl.
CPC ... *G06F 8/61* (2013.01); *G06F 8/63* (2013.01)

(58) Field of Classification Search
CPC ................................................ G06F 3/0481
USPC ........................................................ 715/764
See application file for complete search history.

(56) References Cited

U.S. PATENT DOCUMENTS

| 6,512,526 B1 * | 1/2003 | McGlothlin et al. | 715/762 |
| 8,671,176 B1 * | 3/2014 | Kharitonov et al. | 709/223 |
| 2003/0046680 A1 * | 3/2003 | Gentry | 717/176 |
| 2007/0106984 A1 * | 5/2007 | Birk Olsen et al. | 717/174 |
| 2007/0240150 A1 | 10/2007 | Gangwar et al. | |
| 2008/0244167 A1 * | 10/2008 | Tolmie | 711/104 |
| 2010/0306590 A1 * | 12/2010 | Anand et al. | 714/32 |

FOREIGN PATENT DOCUMENTS

| EP | 1 227 399 A2 | 7/2002 |
| EP | 2 278 460 A2 | 1/2011 |
| GB | 2 411 260 A | 8/2005 |

OTHER PUBLICATIONS

Communication dated Oct. 1, 2012 for co-pending European Patent Office Application No. 10 007 343.6 (5 pp.).
Extended European Search Report dated Oct. 29, 2010 for co-pending European Patent Office Application No. 10 007 343.6 (8 pp.).
"Preinstalling Microsoft Windows XP by Using the OEM Preinstallation Kit, Part I", Internet article, http://uk.builder.com/whitepapers/0.39026692,60083008p-39001044q.00htm, 2003 (article retrieved on Oct. 19, 2004), (24 pp.).
Examiner's First Report dated Dec. 13, 2011 for co-pending Australian Patent Application No. 2010202952 (2 pp.).
Patent Examination Report No. 3 dated Feb. 8, 2013 for co-pending Australian Patent Application No. 2010202952.

* cited by examiner

*Primary Examiner* — Boris Pesin
*Assistant Examiner* — Angie Badawi
(74) *Attorney, Agent, or Firm* — Brinks Gilson & Lione

(57) ABSTRACT

A system image customization tool provides an efficient and cost effective way to implement a highly customizable system image for a digital device. The system image customization tool controls application installation, device settings, and selection, delivery methods and licensing options for products, applications and services with minimal or no customer interaction from the customer's first out of box experience with the device and through the lifecycle use of the device. The system image customization tool provides retailers, original equipment manufacturers and products, applications and services providers a way to create new distribution channels and partnerships.

21 Claims, 18 Drawing Sheets

SYSTEM IMAGE CUSTOMIZATION TOOL

CROSS REFERENCE TO RELATED APPLICATIONS

This application claims the benefit of U.S. Provisional Application Ser. No. 61/225,908, filed Jul. 15, 2009.

BACKGROUND OF THE INVENTION

1. Technical Field

This disclosure concerns efficiently implementing a highly customizable system image for a digital device. In particular, this disclosure relates to controlling application installation, device settings, and selection, delivery methods and licensing options for products, applications and services with minimal or no customer interaction from the customer's first out of box experience with the device and through the lifecycle use of the device.

2. Background Information

Today, original equipment manufacturers (OEM) of digital devices pre-load on the digital devices the OEM's configuration of trial and fully functional products, applications and services (PAS), pre-selected communications settings (e.g., internet settings) and connectivity options (e.g., telecommunications service providers). The OEM controls the initial settings, options and PAS (SOPAS) configurable for the digital device (e.g., personal computers (PC), personal data assistants (PDAs), and other such devices that employ an operating system), including anti-virus and productivity office suites, pre-selected internet settings (e.g., browser homepage, search tool, favorites, and toolbar) and tools to manage music, photos, and video, and internet connectivity options. The customer's first interaction with the digital device (e.g., the out of box experience (OOBE)), as controlled by OEMs, requires the customer to expend significant effort and interaction with the device in order to configure and manage the SOPAS to the satisfaction. This is true in part because any range of SOPAS may or may not be desired by the customer.

In other words, OEMs provide a closed approach OOBE and control the PAS branding, delivery methods and licensing options. The closed approach OOBE prevents retailers from customizing PAS and the operating system image. The closed approach OOBE determines the revenue streams to PAS providers, limits the retailer's relationship with the customer to the point of sale (POS) of the device, and limits the distribution channels and partnership opportunities between PAS providers and retailers. The closed approach OOBE does not provide customers the flexibility to select PAS delivery methods and licensing options (e.g., trial, advertiser sponsored, per-use, fully paid, and subscriptions). The closed approach OOBE also prevents the customer from choosing when and to what extent the customer engages the retailer and PAS providers.

Therefore, a need exists to address the problems noted above and other previously experienced.

SUMMARY

The system image customization tool (ICT) provides a customer with a personalized computing experience that empowers the customer to take control and manage their device settings and PAS selections from initial operating system (OS), OOBE and throughout the lifecycle use of the device. The ICT provides the customer with the ability to customize the computing environment in order to best meet the customer's needs by seamlessly presenting settings, options and PAS (SOPAS) to the customer for installation with minimal or without customer interaction.

A digital device installed with the ICT invokes the ICT when the customer turns on the device. In one implementation, the digital device invokes the ICT the first time the device is turned on, or whenever the customer turns the device on and has not previously completed the ICT, when requested by the customer, or at other selected times. The digital device may also condition execution of the ICT upon customer login to the device. The ICT includes a setup installer that creates a scheduled task in a task manager of the operating system of the device. The schedule task is configured to launch the ICT automatically as noted above, e.g., at device start up and customer log on. The ICT may consequently execute whenever the customer logs on to the device. The ICT executes with elevated (administrator) privileges in order to execute administrative tasks without security exceptions, so that the ICT may check for updates, download and install PAS updates and execute silent installations for selected PAS (e.g., digital shelf offerings). For example, the ICT may execute under the "administrators" group with the highest privileges to prevent and/or suppress user access control (UAC) prompts. The ICT, when invoked, may modify the scheduled task to enable, disable, or recreate all or particular aspects of the ICT. On uninstall the ICT setup removes the scheduled task from the task manager and may remove all components of the ICT.

BRIEF DESCRIPTION OF THE DRAWINGS

The system, method and product are described by example in the following enclosed figures. Specific features described in the figures are examples that may be arbitrarily combined with each other.

DETAILED DESCRIPTION

In one implementation, the system image customization tool (ICT) comprises setup installer instructions (e.g., setup installer) executable by a processor coupled to a memory of a digital device (e.g., target system), that cause the processor to create and schedule task instructions that are executable by the processor the first time the device is turned on, or whenever the customer turns the device on and has not previously completed the ICT, when requested by the customer, or at other selected times. The scheduled task instructions comprise a location identifier for system image customization instructions executable by the processor and an execution level identifier that identifies a level of execution privileges to use to execute the system image customization instructions (SICI). The setup installer instructions set the execution level identifier for the scheduled task to the highest execution privilege (e.g., administrator privilege) in order to prevent the processor from presenting a user access/account control (UAC) prompt when the processor executes the scheduled task instructions. The setup installer instructions cause the processor to store, in the memory at the location specified by the location identifier, the SICI. The SICI cause the processor to display, on a graphical user interface of the target system (e.g., digital device), digital shelf offerings 128 (e.g., PAS) to a customer when the customer logs onto the target system (e.g., digital device). The SICI receive, through the graphical user interface (e.g., user interface), a customer selection of at least one of the digital shelf offerings 128 and configure the at least one of the digital shelf offerings 128.

Figure 1:
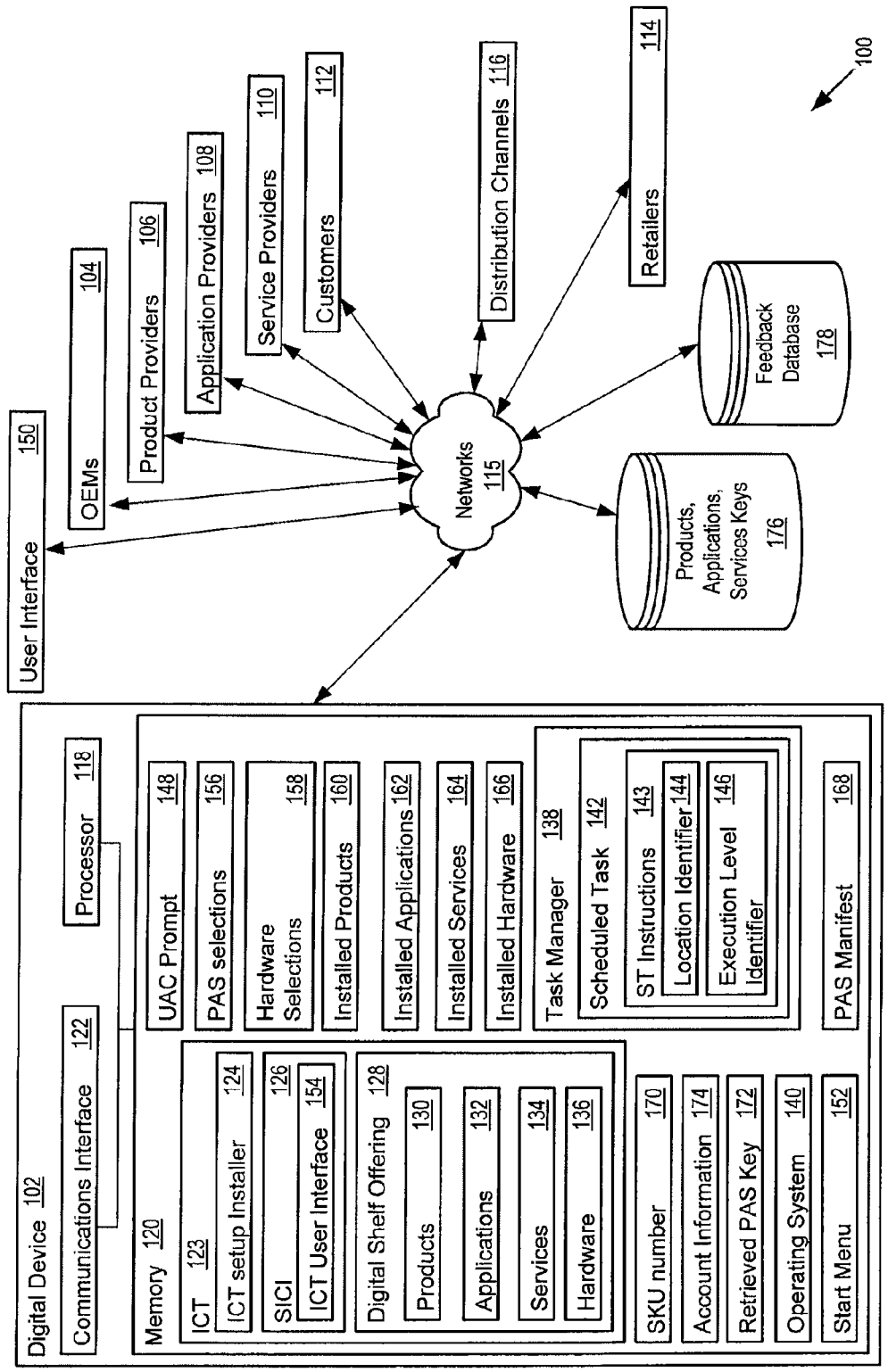
FIG. 1 illustrates a system image customization tool (ICT) system configuration.

FIG. 1 illustrates a system image customization tool (ICT) system configuration 100. The ICT system configuration 100 includes a digital device 102, OEMs 104, products providers 106, applications providers 108, services providers 110, customers 112, and retailers 114 in communication through networks 115 (e.g., the Internet) and/or various distribution channels 116 used to deliver the digital device 102 to market. The digital device 102 includes a processor 118 coupled to a memory 120 and communication interface 122 used to communicate with the various components of the ICT system configuration 100.

The memory 120 of the digital device 102 includes a system image customization tool (ICT) 123 that includes the ICT setup installer 124, SICI 126 and a digital shelf offering 128 of PAS for customer 112 selection. The digital shelf offering 128 may include products 130, applications 132, services 134, and hardware 136 the customer 112 may select for install through the SICI 126. The memory 120 also includes various components of the operating system 140 for the digital device 102, including a task manager 138 where the ICT setup installer 124 creates and schedules a scheduled task 142. The scheduled task 142 includes schedule task instructions 143, a location identifier 144 and an execution level identifier 146. The location identifier 144 identifies the location (e.g., memory 120 and/or another storage area) where the SICI 126 may be stored for retrieval. The execution level identifier 146 identifies a level of execution privileges the processor 118 may use to execute the SICI 126. The setup installer 124 sets the execution level identifier 146 to the highest execution privilege (e.g., administrator privilege) in order to prevent the processor 118 from presenting a user access/account control (UAC) prompt 148 through a user interface 150 (e.g., graphical user interface). When the digital device 102 starts and/or when the customer 112 selects the SICI 126 from a start menu 152, the SICI 126 displays a ICT user interface (ICT UI) 154 through the user interface 150. The ICT UI 154 displays the digital shelf offerings 128 (e.g., 130, 132, 134, and 136) for customer 112 selection (e.g., PAS selections 156 and/or hardware selections 158). The SICI 126 receives the customer's 112 PAS selections 156 and/or hardware selections 158 the SICI 126 configures the products, applications, services, and/or hardware corresponding to the PAS selections 156 and/or hardware selections 158. The SICI 126 may determine installed products 160, installed applications 162, installed services 164 and installed hardware 166, in order to create and/or update a PAS manifest 168 that identifies detail information about the digital device configuration.

In one implementation, the retailer 114 may assign a stocking keeping unit (SKU) number 170 to the digital device 102. The customer 112 purchases the digital device 102 and communicates PAS selections 156 and/or hardware selections 158 to the retailer 114. In one implementation, the customer may identify the PAS selections 156 and/or hardware selections 158 in advance of the purchase of the digital device 102 and communicate the PAS selections 156 and/or hardware selections 158 to the retailer 144 at the point of sale (POS) of the digital device to the customer 112. The retailer 114 generates a PAS key that the SICI 126 later retrieves (e.g., retrieved PAS key 172) based on the customer's PAS selections 156 and/or hardware selections 158 and the SKU number 170 assigned to the device. The retailer 114 stores the PAS key 172 for retrieval by the SICI 126. The customer 112 may provide the retailer 114 with account information 174 for the SICI 126 to use to submit payment for PAS selections 156 and/or hardware selections 158 during the installation of the PAS selections 156 and/or hardware selections 158. When the customer starts the device 102 and the SICI 126 retrieves the PAS key 172 and the SICI 126 installs the PAS selections 156 and/or hardware selections 158 without customer interaction. The ICT system configuration 100 also includes a products, applications, services (PAS) keys repository 176 where the retailer 114 may store PAS keys 172 for the SICI 126 to retrieve for install of customer selected PAS without customer interaction. The ICT system configuration 100 may also include a feedback database 178 discussed in detail below.

In one implementation, a retailer 114 provides the ICT 123 to OEMs and retailer's 114 technical staff for install on the devices. The OEM's distribution channels for the devices and PAS providers may partner with the retailer 114 in order to coordinate integration of the ICT 123 with the devices and the PAS offered under the digital shelf offering 128, including integration of production and delivery time lines. The OEMs may conduct testing and certification of the ICT 123 with the device and the PAS offered under the digital shelf offering 128.

The installation of at least one anti-virus/anti-spam (AV/AS) product may be pre-installed with or prior to the install of the ICT. OEMs may configure devices only with the ICT 123 and OEM hardware-specific utilities and device drivers. In one implementation, the ICT setup installer 124 creates and configures a scheduled task in Microsoft™ Vista™ task scheduler so that the scheduled task executes "at logon" for "a customer". The setup installer 124 may export the task into an xml file (e.g., task.xml) that includes the location identifier for the SICI 126 (also referred to as the system image customization program). The location identifier may be a token that the setup installer 124 replaces, using token replacer instructions, upon execution with a particular location the setup installer 124 retrieves from a key, certificate and/or the internet (e.g., retailer 114 specified remote location). The setup installer 124 stores the task.xml file and the token replacer instructions in configurable locations on the device. In one implementation, the setup installer 124 stores Microsoft™ Windows Installer code (MSIcode) in configurable locations on the device to execute the token replacer instructions, in order to replace the token in the task.xml file with the location of the SICI 126. In one implementation, the token replacer instructions employ the following parameters: file path; token to replace identifier; and replacement string.

In one implementation, the setup installer 124 employs InstallAware™ (available from Macrovision Corporation in the United States) to create the scheduled task instructions using the task.xml file as a configuration. The setup installer 124 may use InstallAware™ to recreate the scheduled task in the Vista™ task scheduler, in the event the scheduled task instructions are deleted from the Vista™ task scheduler. The setup installer 124 may also use the InstallAware™ to configure the device with the SICI 126 and digital shelf offerings 128 (e.g., PAS), and place a shortcut for ICT 123 on the start menu of the device. In one implementation, the setup installer 124 configures the ICT 123 so that a customer may uninstall the ICT 123 from the "Programs and Features" widget in the control panel of the device.

Figure 2:
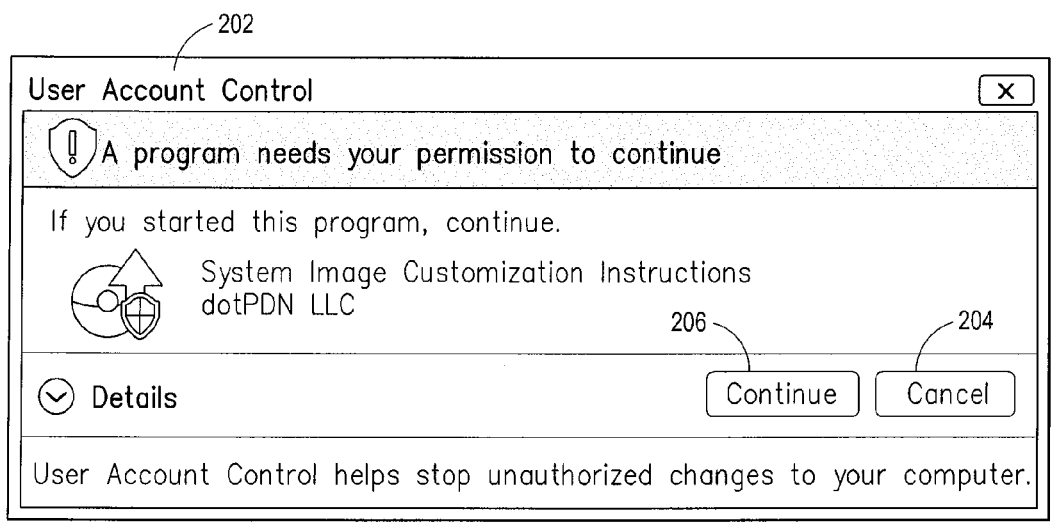
FIG. 2 shows a customer account control prompt that a digital device may display.

FIG. 2 shows a customer account control prompt 202 that the customer's digital device may display when the customer starts the digital device. User account control helps prevent unauthorized changes to the customer's digital device (e.g., PC system). The customer may choose to cancel execution of the SICI 126 by selecting the cancel button 204 on the user account control prompt 202. Alternatively the customer may select the continue button 206 to execute the SICI 126.

The SICI 126 and dynamic link library files (DLL's) are signed with a software signing certificate issued by a trusted authority in order to package and sign the setup installer 124. Signing the SICI 126 causes the device to present a Vista™ UAC prompt to the customer whenever the customer executes the ICT. The setup installer 124 may be configured to install the SICI 126 in interactive or silent mode. In one implementation, the setup installer 124 is configured as a "Web Build" so that when the setup installer 124 executes, the setup installer 124 automatically locates the SICI 126 on the device without prompting for original source media by displaying a media browser to the customer. The setup installer 124 performs "manual update checking" and monitoring URL, and verifies the version of the setup installer 124, the SICI 126, digital shelf offerings 128 (e.g., PAS), and patches and updates to ensure proper installation of the offerings, patches and updates. In one implementation, the ICT 123 supports patching of PAS without performing a full reinstall. The ICT setup installer 124 may increment a product version identifier for the ICT setup installer 124 in the PAS manifest with each update of the ICT setup installer 124. In one implementation, the ICT setup installer 124 does not cache the digital shelf offerings 128 or the pre-requisites for the digital shelf offerings 128 after installation.

In one implementation, the ICT 123 (e.g., setup installer 124 and SICI 126) executes on the Vista™ SP1 operating system and is built with .Net Framework™ 3.5 SP1 and the setup installer 124 detects whether .Net Framework™ 3.5 SP1 is installed on the device. In the event the setup installer 124 does not detect the .Net Framework™ 3.5 SP1 the setup installer 124 installs the .Net Framework™ 3.5 SP1. In one implementation, the setup installer 124 installs natively on 32-bit and 64-bit operating systems so that the setup installer 124 may install the SICI 126 to the "Program Files" directory on 64-bit machines and write to the correct (64 bit) section of the registry. The setup installer 124 may also deploy a single digital shelf (e.g., PAS for selection by a customer) containing x86 and x64 installers. The setup installer 124 determines the device's architecture and sets the mode (e.g., 32-bit and 64-bit) of installation to match the device's architecture.

In one implementation, the ICT 123 uses Microsoft™ Windows Installer (MSI) technology, which provides a mechanism for checking installation conditions, installing files for all customers, creating shortcuts, performing self-repair and rollbacks on failures, and cleanly uninstalling the SICI 126. In one implementation, the setup installer 124 installs the SICI 126, a digital shelf file that includes the installers for the PAS, and .Net Framework™ 3.5 SP1 installer. In one implementation, the ICT 123 deploys the digital shelf file as a Lempel-Ziv-Markov chain Algorithm (LZMA) compressed file. The setup installer 124 stores the digital shelf file on the device and the SICI 126 extracts the digital shelf file to a configurable location within a SICI 126 resources folder.

Table 1 shows an example MSIscript that the ICT 123 may configure to check for the presence of the digital shelf file.

TABLE 1

MSIscript example

[DEFINE REGION: Process (Un)Installation]
label: Main Install
Comment: Check for Digital Shelf files
[compiler if Variable BUILDMODE not Equals PATCH]
if Variable REMOVE Equals FALSE
    if Variable WIZARD not Equals CANCEL
        Set Variable DIGITALSHELF_FILE to
        Does File Exist $SFXPATH$DigitalShelf.en-US.7zip (get result into variable DIGITALSHELF_FILE)
        if Variable DIGITALSHELF_FILE not Equals TRUE
          MessageBox: $TITLE$ Setup, File necessary to install Digital Shelf could not be located.$NEWLINE$$NEWLINE$Ensure DigitalShelf.en-US.7zip file is present with the installation$NEWLINE$$NEWLINE$$TITLE$ Setup cannot continue.
          Terminate Installation
        end
    end
end
[compiler end]

Table 2 shows example code that may be included in a "Perform First Time or Maintenance Installation" region, following execution of an "Apply Install" command in order to configure the setup installer 124 and subsequently to configure a patch or update.

TABLE 2

Perform First Time or Maintenance Installation Sample Code

[DEFINE REGION: Perform First Time or Maintenance Installation]
...
Apply Install (get result into variable SUCCESS)
if Variable SUCCESS not Equals ERROR
　if Variable SUCCESS not Equals CANCEL
　　Comment: Extract Digital Shelf files to Target Dir. Ignored if file not found
Extract 7Zip Archive $SFXPATH$DigitalShelf.en-US.7zip into folder $TARGETDIR$\Resources\Localization\en-US\DigitalShelf
...

In one implementation, the setup installer 124 stores the installation packages for the digital offerings (e.g., installation bits or "bits" for the PAS that include instructions executable by the processor) in a folder accessed by the SICI 126 when the device starts. The setup installer 124 may store the bits in a hidden location so that the customer of the device cannot locate or delete the bits.

Figure 3:
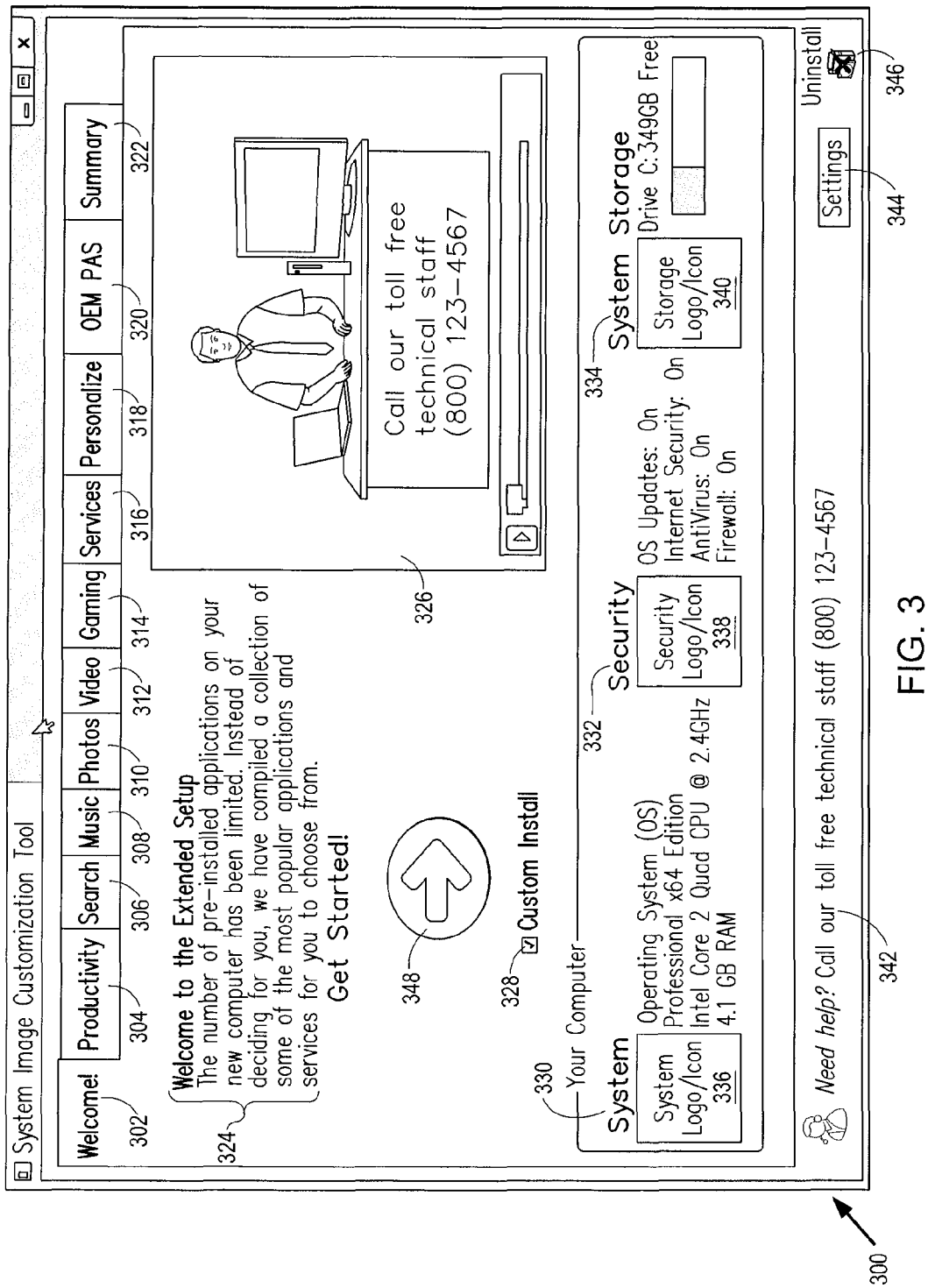
FIG. 3 shows an example system image customization tool user interface (ICT UI).

FIG. 3 shows an example system image customization tool user interface (ICT UI) 300. When the SICI 126 starts, the ICT UI 300 presents a SICI welcome 302 display to the customer. The ICT UI 300 also displays additional customer selectable tabs for each category of products, applications and services (PAS) referred to collectively as the digital shelf offering 128. The categories of digital shelf offerings 128 include productivity 304, search 306, music 308, photos 310, video 312, gaming 314, services 316, personalize 318, and OEM PAS 320. The ICT UI 300 also provides a customer selectable SICI summary 322 tab. In another implementation, the ICT UI 300 may display fewer, more and/or different categories of digital shelf offerings 128, and fewer, more and/or different PAS may be listed under the categories according to various factors, including the preferences of retailers 114, customers 112, the OEM 104, and/or the PAS providers (e.g., 106, 108 and 110).

The SICI welcome 302 display presents a description 324 of the purpose and benefits of using the SICI 126. The SICI welcome 302 display also includes a media block 326 that presents a multimedia presentation that describes the purpose, benefits and procedure for using the SICI 126. The SICI welcome 302 display present a customer selectable customer install 328 object (e.g., button or check box) that the customer may select to acknowledge the customer's desire to customize the install using the SICI 126. The SICI welcome 302 display may further present system information 330, security information 332 and system storage information 334 for the digital device. The SICI welcome 302 display may include logo's and/or icons (e.g., 336, 338, 340) for the system information 330, security information 332 and system storage information 334. The SICI welcome 302 display presents contact information 342 (e.g., a toll free number for technical staff support) and additional settings 344 for the customer to customize the ICT 123 and installation of selected digital shelf offerings 128. The SICI welcome 302 display also presents a customer selectable uninstall 346 object that the customer may select to uninstall the SICI 126 and the ICT 123 components (e.g., ICT setup installer 124 and digital shelf offerings 128). The customer continues the SICI custom install by selecting the next 348 object. When the customer selects the next 348 object, the SICI 126 presents the next tab (e.g., the productivity 304 category).

Figure 4:
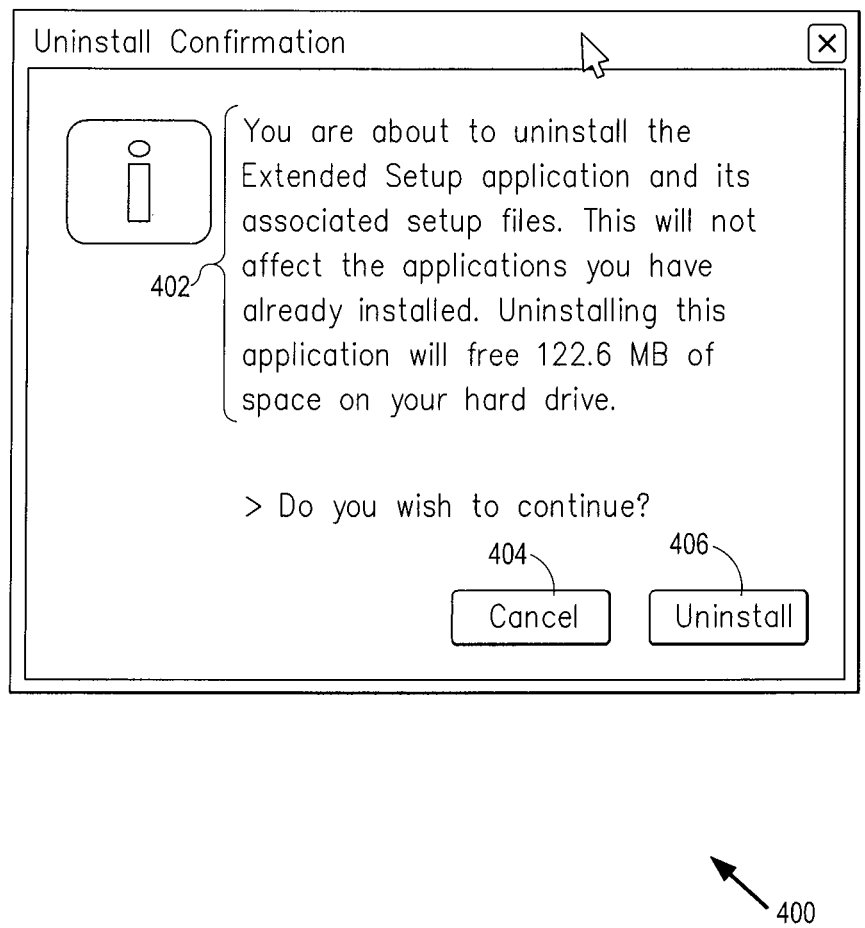
FIG. 4 shows an example uninstall confirmation prompt that the ICT UI may display.

FIG. 4 shows an example uninstall confirmation prompt 400 that the ICT UI 300 may display when the customer selects the customer selectable uninstall 346 object from the SICI welcome 302 display. The uninstall confirmation prompt 400 may include a uninstall information 402 that describes consequences of uninstalling the SICI 126. The uninstall confirmation prompt 400 also displays a customer selectable cancel 404 object and a customer selectable uninstall 406 object. When the customer selects the customer selectable cancel 404 object, the ICT UI 300 returns the customer to the SICI welcome 302 display. When the customer selects the customer selectable uninstall 406 object, the SICI 126 uninstalls the SICI 126 and digital shelf offerings 128.

Figure 5:
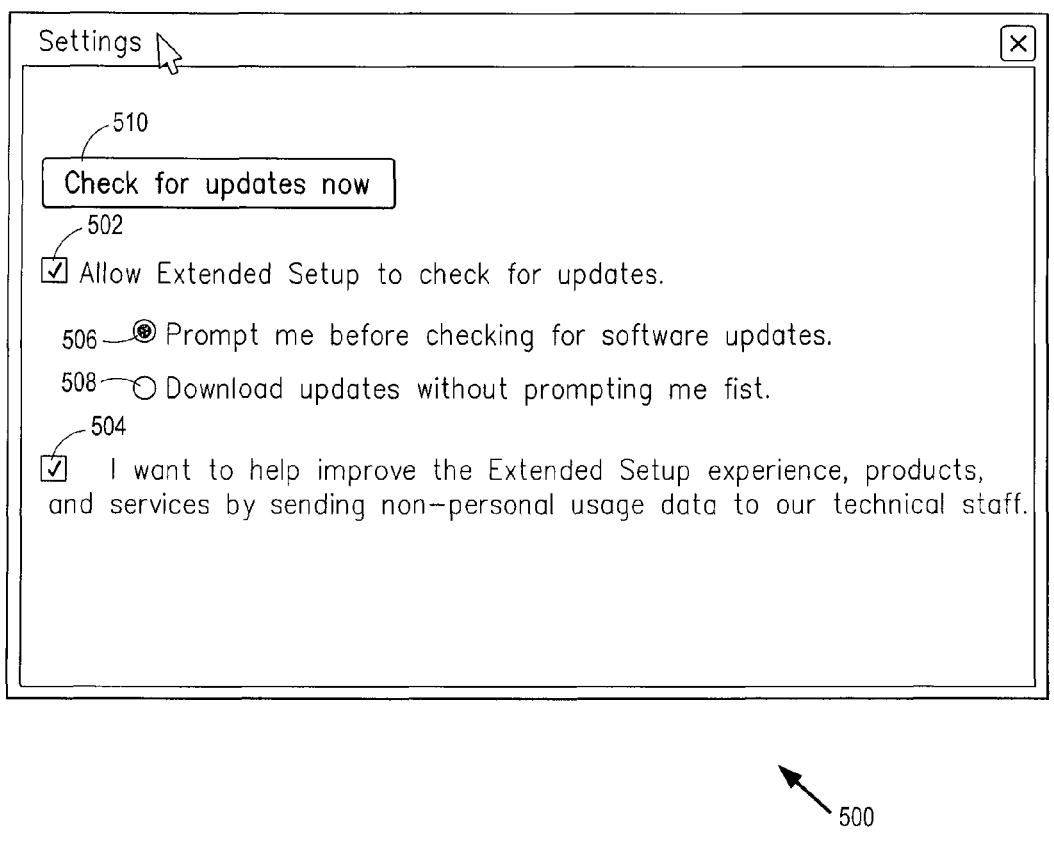
FIG. 5 illustrates an example settings prompt that the ICT UI may display.

FIG. 5 shows an example settings prompt 500 that the ICT UI 300 may display when the customer selects the customer selectable additional settings 344 from the SICI welcome 302 display. In one implementation, the SICI 126 may display the settings prompt 500 when the customer selects the additional settings 344 available from any of the SICI selectable tabs (e.g., productivity 304, search 306, music 308, photos 310, video 312, gaming 314, services 316, personalize 318, and OEM PAS 320). The settings prompt 500 presents customer selectable options including an allow check for updates 502 object and a send non-personal usage data 504 object. Under the allow check for updates 502 object the customer may select a prompt before checking for updates 506 object or a download updates without prompting 508 object. When the customer selects the send non-personal usage data 504 object the customer acknowledges and authorizes the SICI 126 to send non-personal information to the retailer 114, and/or OEM and/or PAS providers. When the customer selects the check for updates now 510 object, the SICI 126 locates updates for the SICI 126 and digital shelf offerings 128 based on the customer's settings (e.g., 502, 506 and 508). In one implementation, when the SICI 126 completes the check for updates, the ICT UI 300 displays the SICI welcome 302 display. In another implementation, when the SICI 126 completes the check for updates, the ICT UI 300 displays the SICI display corresponding to the customer selectable PAS tab (e.g., productivity 304, search 306, music 308, photos 310, video 312, gaming 314, services 316, personalize 318, and OEM PAS 320) where the customer originally selected the additional settings 344.

Figure 6:
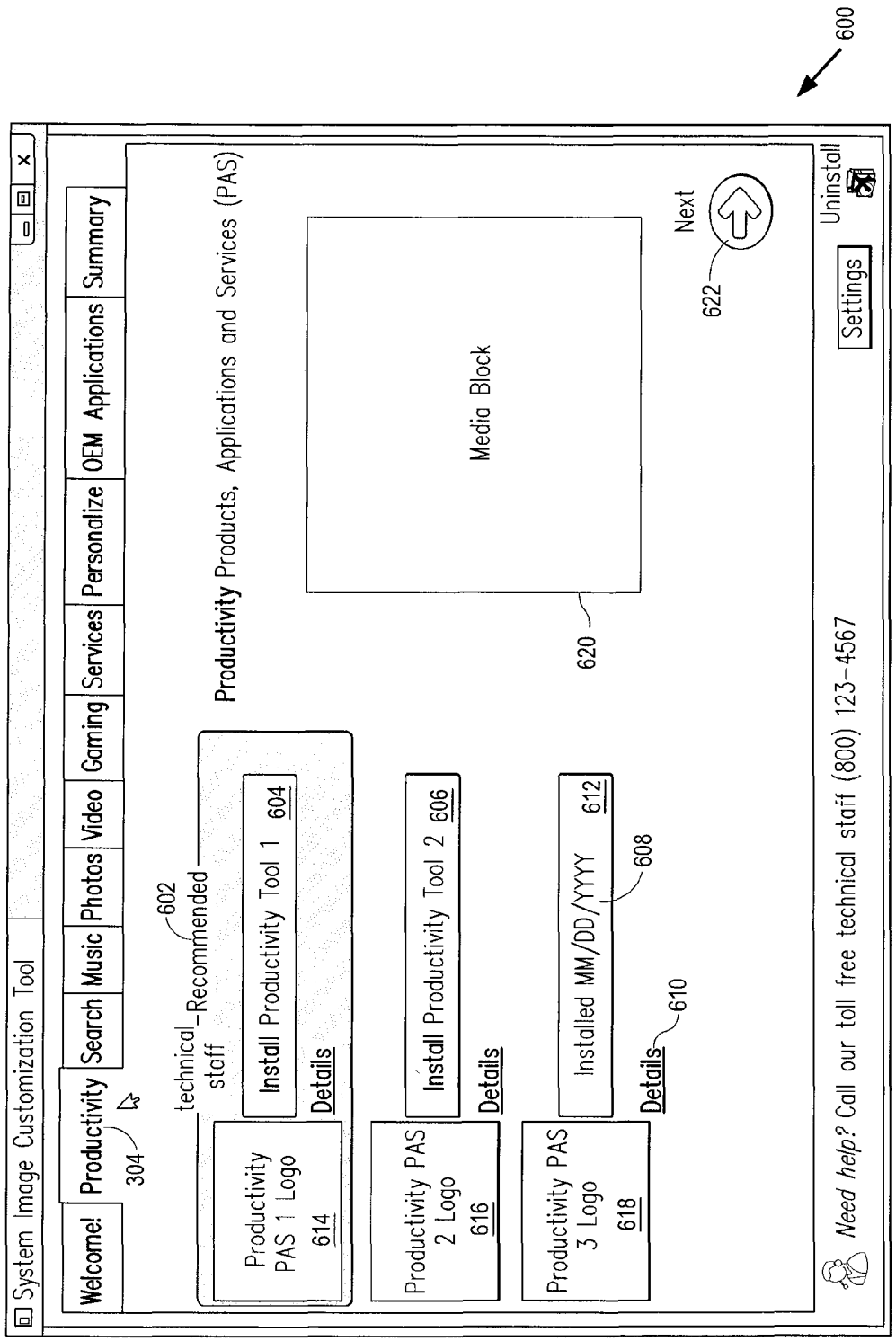
FIG. 6 shows an example of the ICT UI productivity category that the SICI displays.

FIG. 6 shows an example of the ICT UI productivity 600 category that the SICI 126 displays when the customer selects the productivity 304 category tab from the ICT UI 300. The SICI 126 may also display the ICT UI productivity 600 display when the customer selects the next 348 object from the SICI welcome 302 display. The ICT UI productivity 600 category includes customer selectable productivity products, applications and services (PAS). The ICT UI productivity 600 category may indicate one or more recommended productivity PAS 602. Similarly, the SICI 126 may display for each category of products, applications and services (PAS) one or more recommended PAS. The ICT UI productive 600 category displays customer selectable productivity PAS install objects (e.g., 604 and 606) that the customer may select for installation. When the SICI 126 detects that a PAS has already been installed, the ICT UI productivity 600 category displays the installation date 608 and the ICT UI productivity 600 category may not allow the PAS to be customer selectable for install. The ICT UI productivity 600 category also displays a customer selectable details 610 object that presents detailed information about the productivity PAS (e.g., 604, 606 and 612). In one implementation, selecting the details 610 object causes the SICI 126 to present the PAS providers website for detailed information about the productivity PAS. The ICT UI productivity 600 category also displays the logo and/or icon (e.g., 614, 616 and 618) for each productivity PAS (e.g., 604, 606 and 612). In another implementation, when the customer selects a details 610 object, the ICT UI productivity 600 category displays a multimedia presentation about the corresponding productivity PAS (e.g., 602, 604 and 606) in a media block 620. When the customer selects the next 622 object the ICT UI 300 presents the next digital shelf offering category (e.g., search 306). Although not shown, the SICI 126 may display for each category of products, applications and services (PAS) a next 622 object and a previous object.

Figure 7:
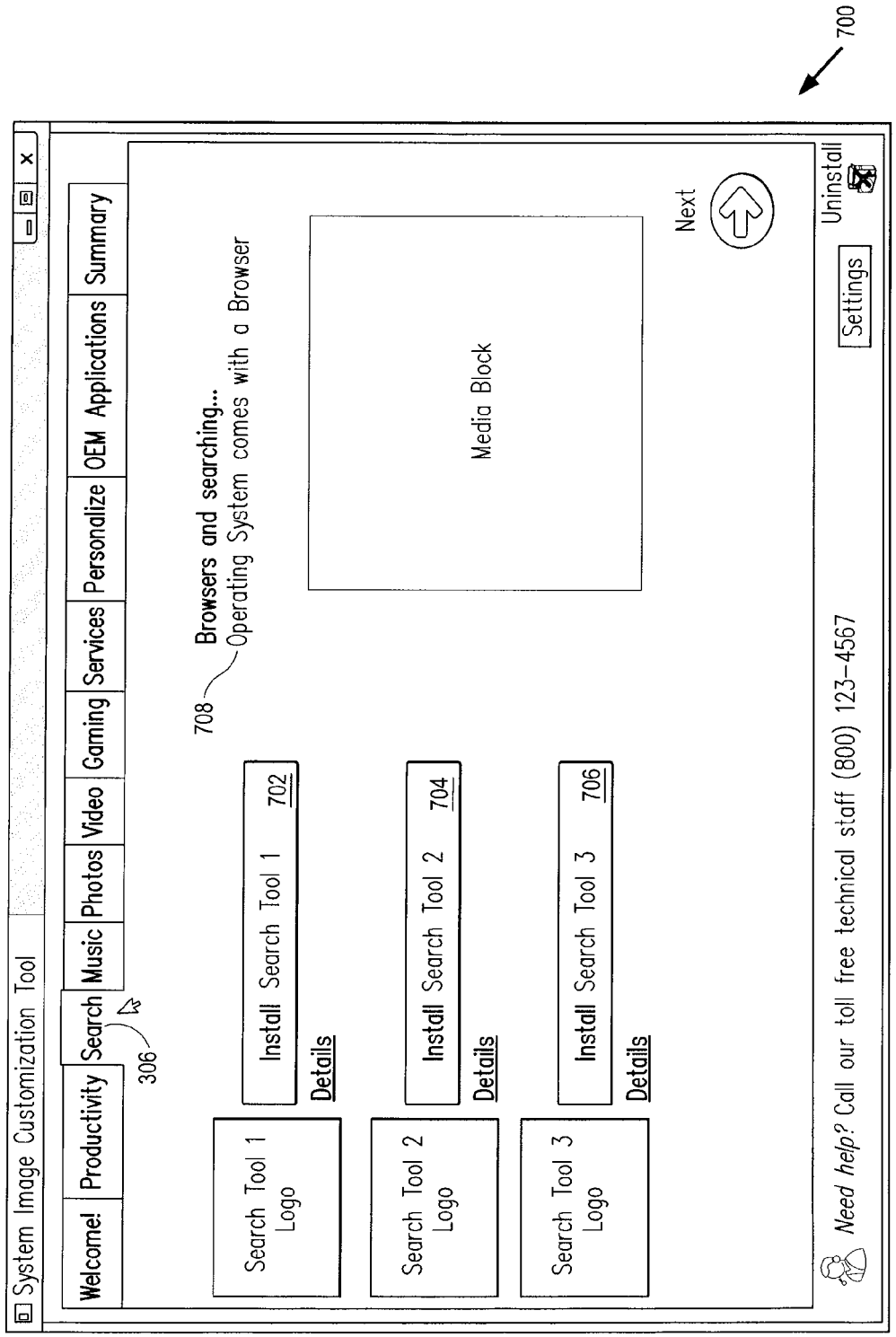
FIG. 7 shows an example of the ICT UI search category that the ICT UI displays.

FIG. 7 shows an example of the ICT UI search 700 category that the ICT UI displays when the customer selects the search 306 category tab from the ICT UI 300. The ICT UI search 700 category includes customer selectable search PAS objects (e.g. 702, 704 and 706) that correspond to PAS for the SICI 126 to install. When the operating system (e.g., Vista™) and/or when the default configuration of the device includes a particular PAS for the category, the ICT UI category indicates the PAS included with the operating system (e.g., 708).

Figure 8:
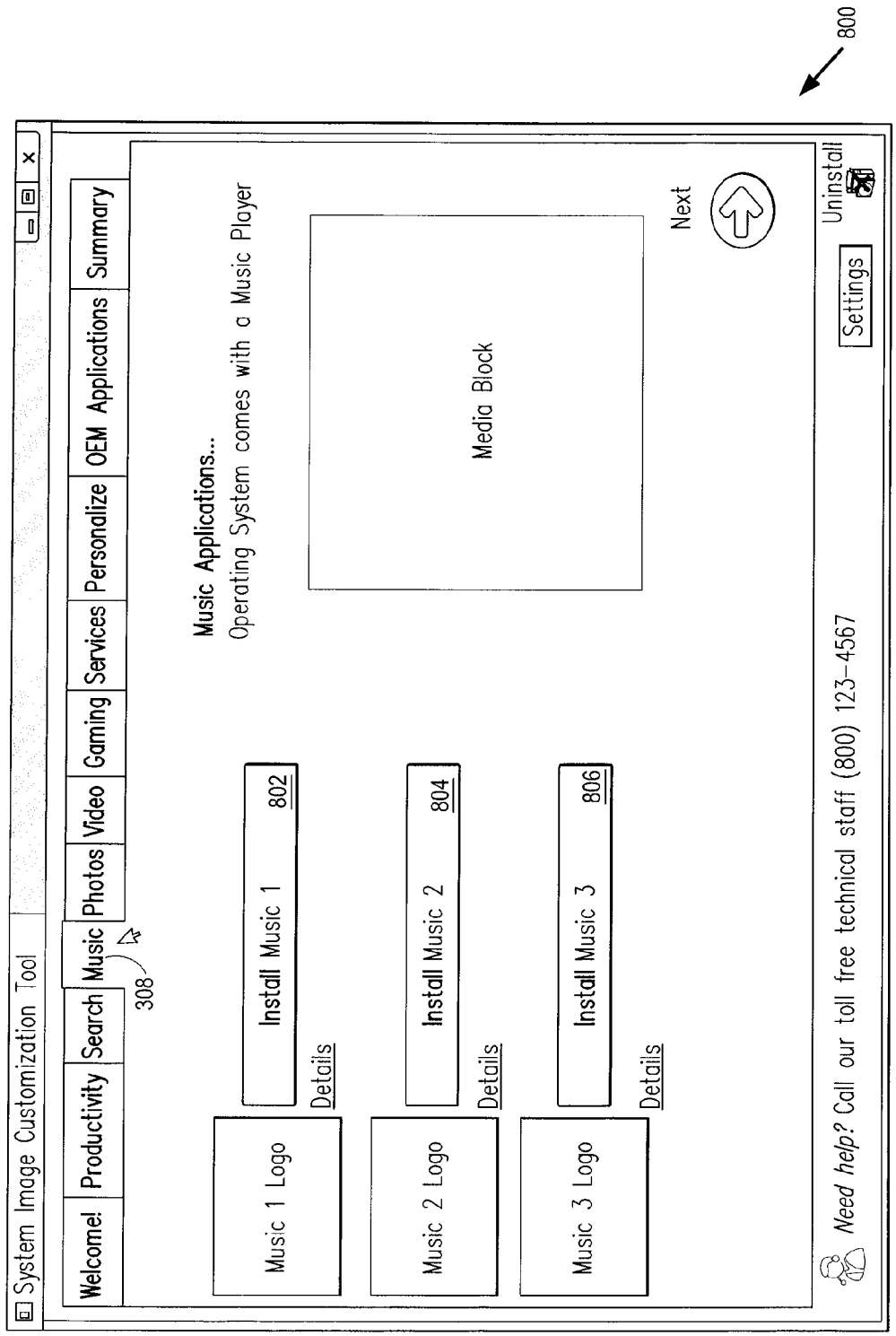
FIG. 8 shows an example of the ICT UI music category that the ICT UI displays.

FIG. 8 shows an example of the ICT UI music 800 category that the ICT UI 300 displays when the customer selects the music 308 category tab from the ICT UI 300. The ICT UI music 800 category includes customer selectable music PAS objects (e.g. 802, 804 and 806) that correspond to PAS for the SICI 126 to install.

Figure 9:
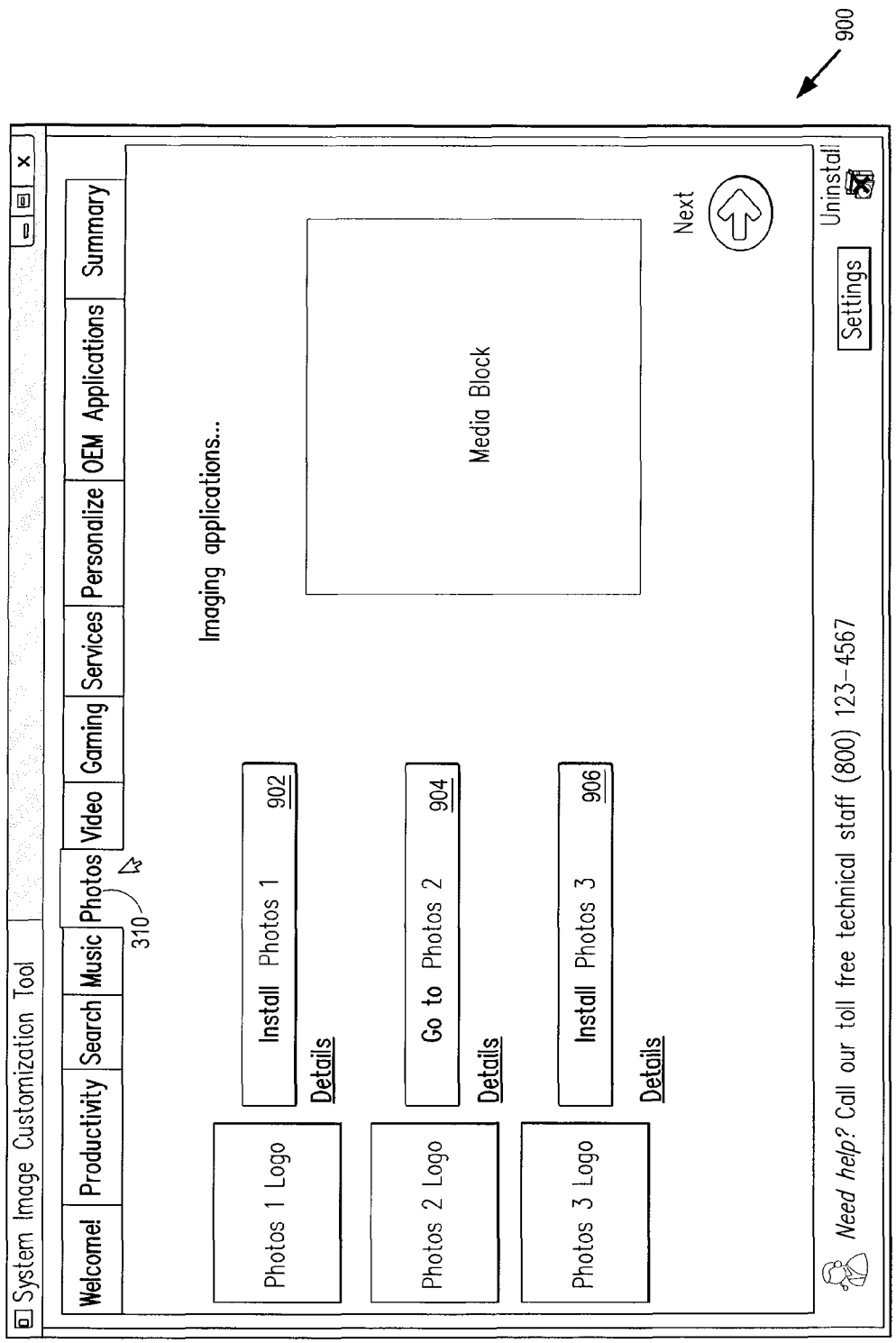
FIG. 9 shows an example of the ICT UI photos category that the ICT UI displays.

FIG. 9 shows an example of the ICT UI photos 900 category that the ICT UI displays when the customer selects the photos 310 category tab from the ICT UI 300. The ICT UI photos 900 category includes customer selectable photos PAS objects (e.g. 902, 904 and 906) that correspond to PAS for the SICI 126 to install.

Figure 10:
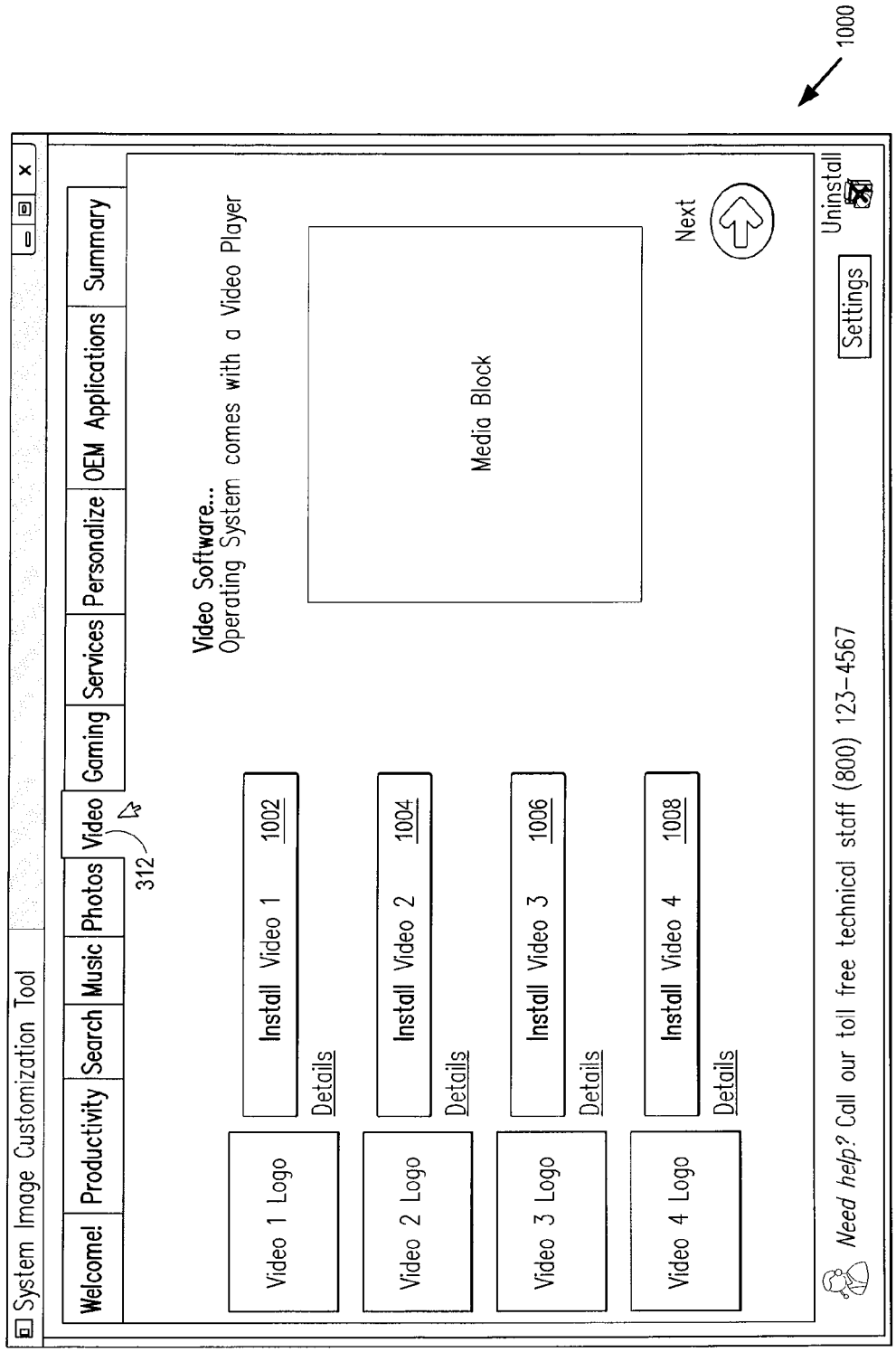
FIG. 10 shows an example of the ICT UI video category that the ICT UI displays.

FIG. 10 shows an example of the ICT UI video 1000 category that the ICT UI displays when the customer selects the video 312 category tab from the ICT UI 300. The ICT UI video 1000 category includes customer selectable video PAS objects (e.g. 1002, 1004 and 1006) that correspond to PAS for the SICI 126 to install.

Figure 11:
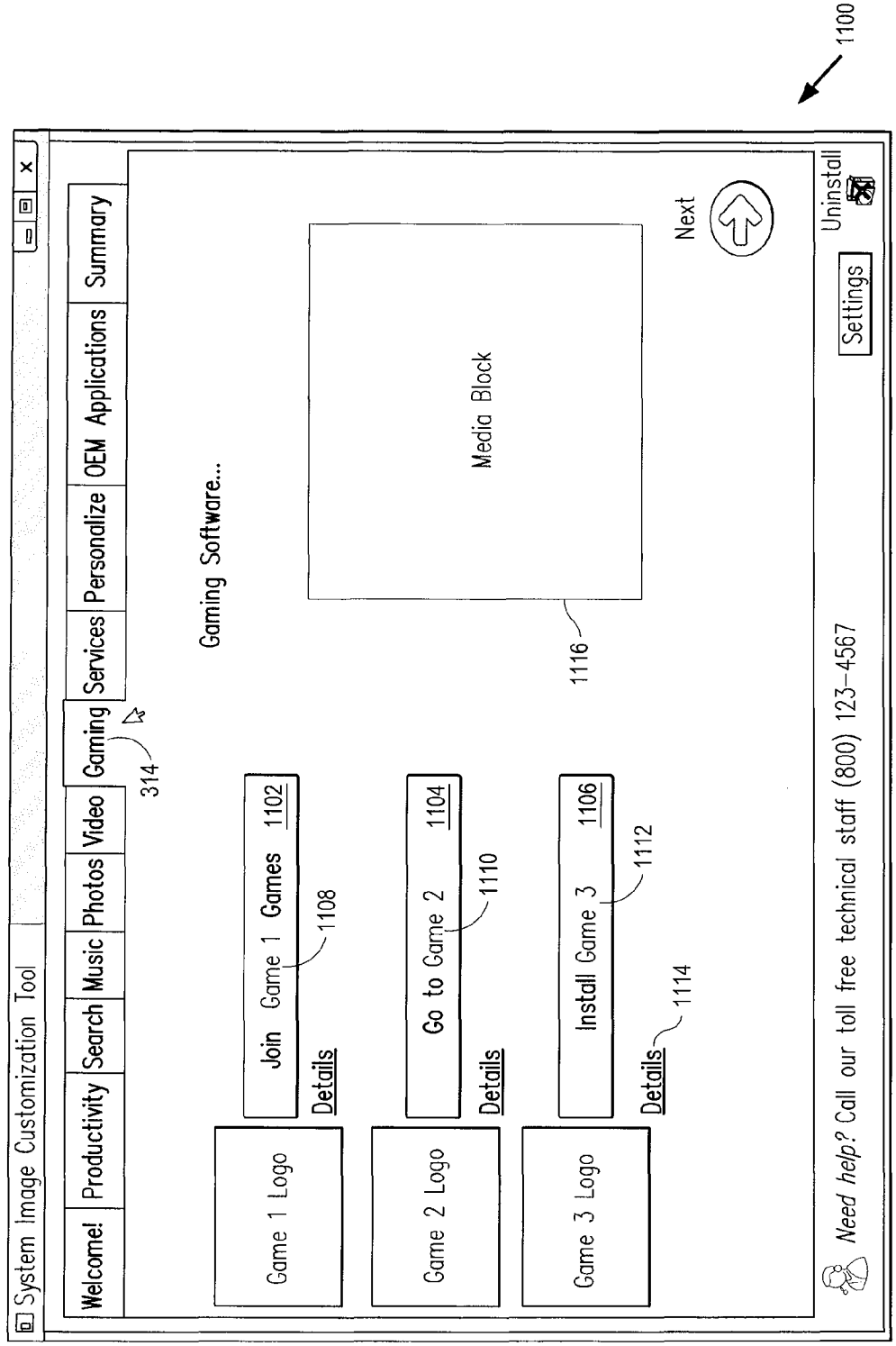
FIG. 11 shows an example of the ICT UI gaming category that the ICT UI displays.

FIG. 11 shows an example of the ICT UI gaming 1100 category that the ICT UI displays when the customer selects the gaming 314 category tab from the ICT UI 300. The ICT UI gaming 1100 category includes customer selectable gaming PAS objects (e.g. 1102, 1104 and 1106) that correspond to PAS for the SICI 126 to install. The ICT UI gaming 1100 category may indicate that the customer may join a game (e.g., 1108), launch and/or navigate directly to a game (e.g., 1110), and install a game (e.g., 1112). In one implementation, when the customer selects the details 1114 object, the media block 1116 object presents an interactive version of the corresponding PAS game for the customer to exercise to evaluate and determine whether to install the game PAS.

Figure 12:
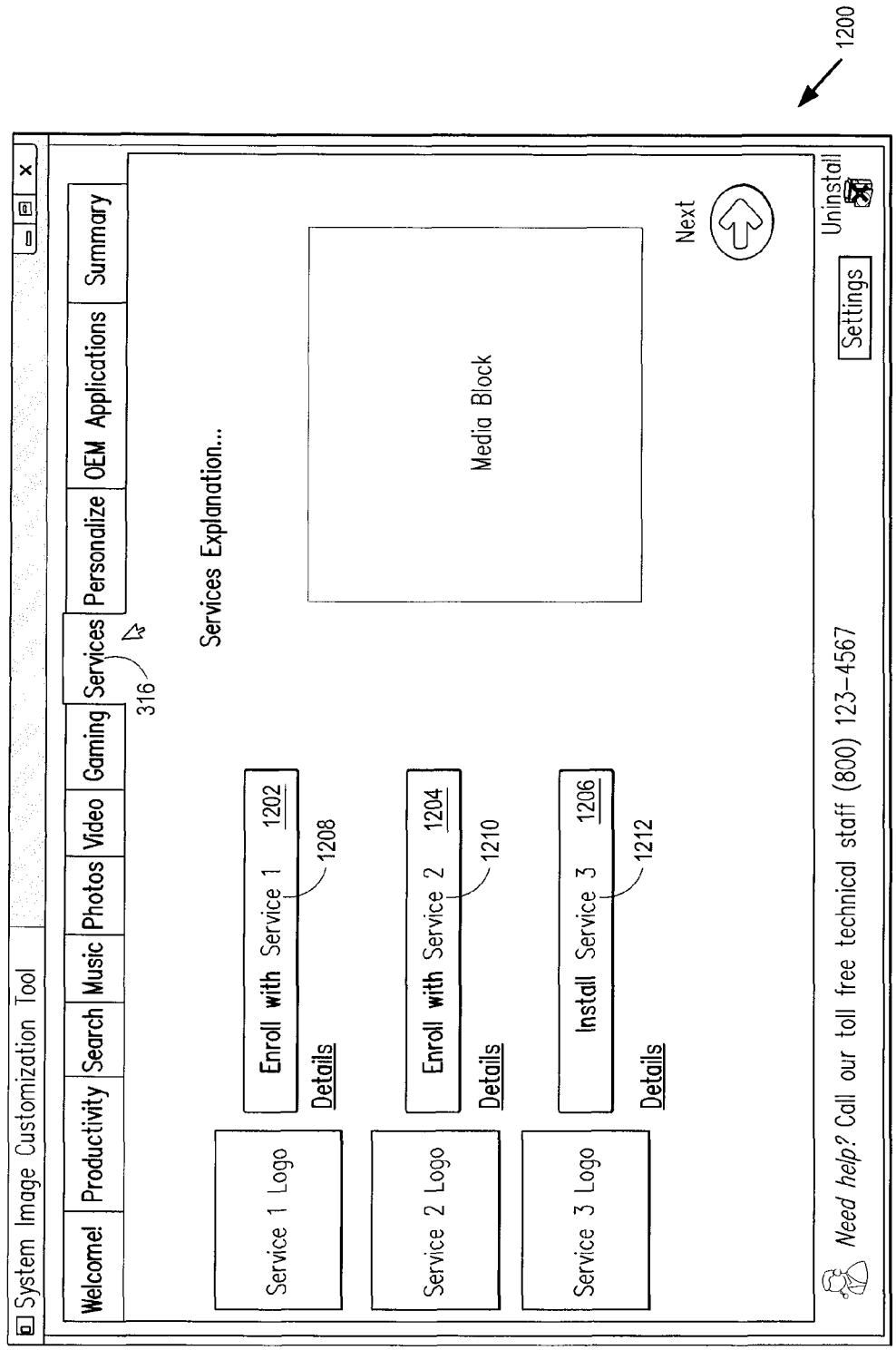
FIG. 12 shows an example of the ICT UI services category that the ICT UI displays.

FIG. 12 shows an example of the ICT UI services 1200 category that the ICT UI displays when the customer selects the services 316 category tab from the ICT UI 300. The ICT UI services 1200 category includes customer selectable services PAS objects (e.g. 1202, 1204 and 1206) that correspond to PAS for the SICI 126 to install. The ICT UI services 1200 category may indicate that the customer may enroll in a service (e.g., 1208 and 1210), and install a service (e.g., 1212). In one implementation, when the customer selects the details 1214 object, the media block 1216 object presents an interactive version of the corresponding PAS service for the customer to exercise to evaluate and determine whether to install the service PAS.

Figure 13:
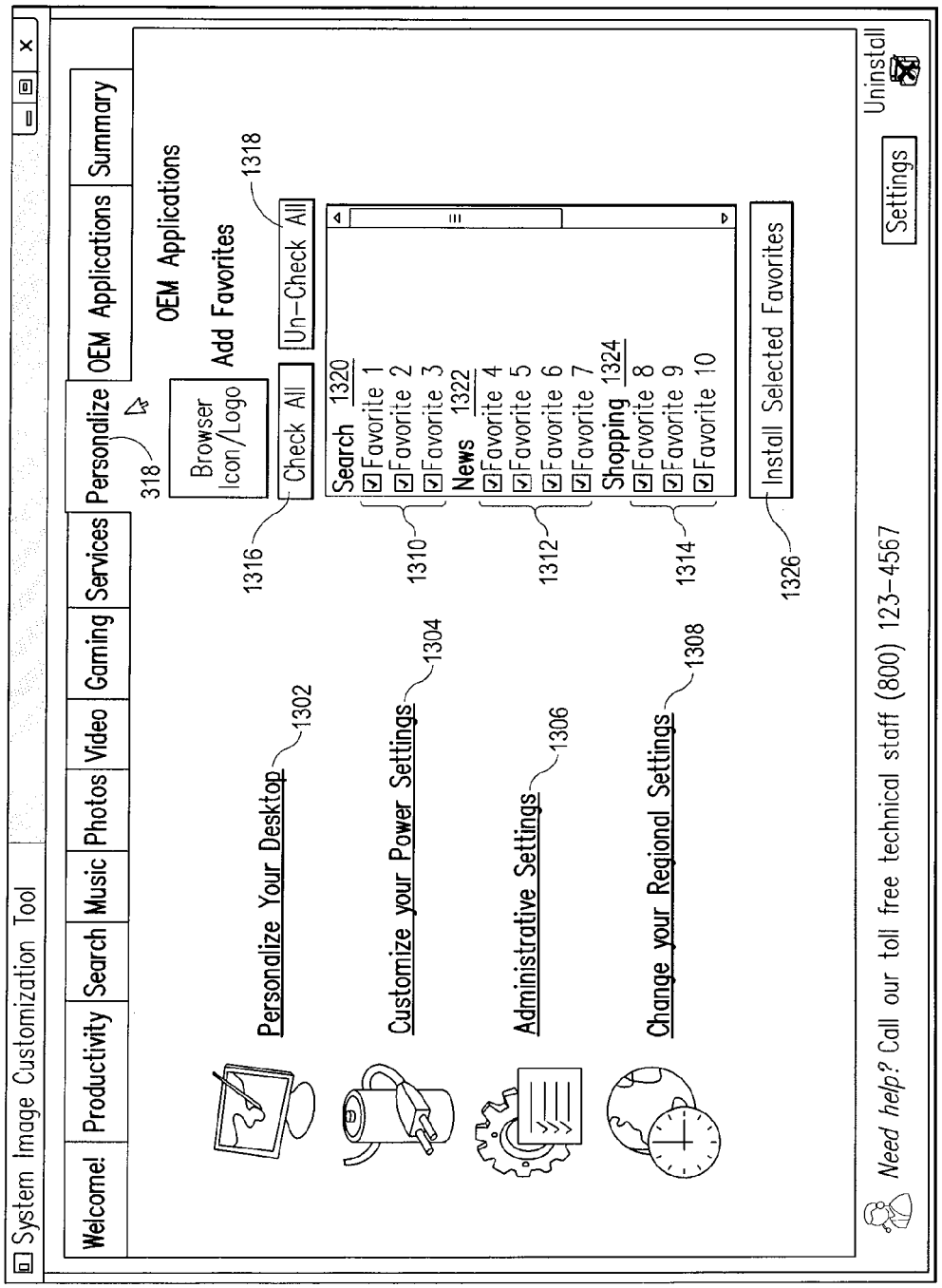
FIG. 13 shows an example of the ICT UI personalize category that the ICT UI displays.

FIG. 13 shows an example of the ICT UI personalize 1300 category that the ICT UI displays when the customer selects the customer selectable personalize 318 category tab from the ICT UI 300. The ICT UI personalize 1300 category includes customer selectable personalize sub-categories (e.g. personalize desktop 1302, personalize power settings 1304, personalize administrative settings 1306 and personalize regional settings 1308). The ICT UI personalize 1300 category may also allow the customer to select and deselect individual favorites (e.g., 1310, 1312 and 1314), as well as select and deselect all favorites (e.g., check all 1316 and uncheck all 1318). The favorites may be grouped in a customer specified hierarchy (e.g., 1320, 1322, and 1324). The ICT UI personalize 1300 category may display an install selected favorites 1326 object for the customer to select to cause the SICI 126 to install the favorites for the customer. In one implementation, the personalize regional settings 1308 causes the ICT UI 300 to display customer selectable country, language and cultural settings for the customer to further personalize the device.

Figure 14:
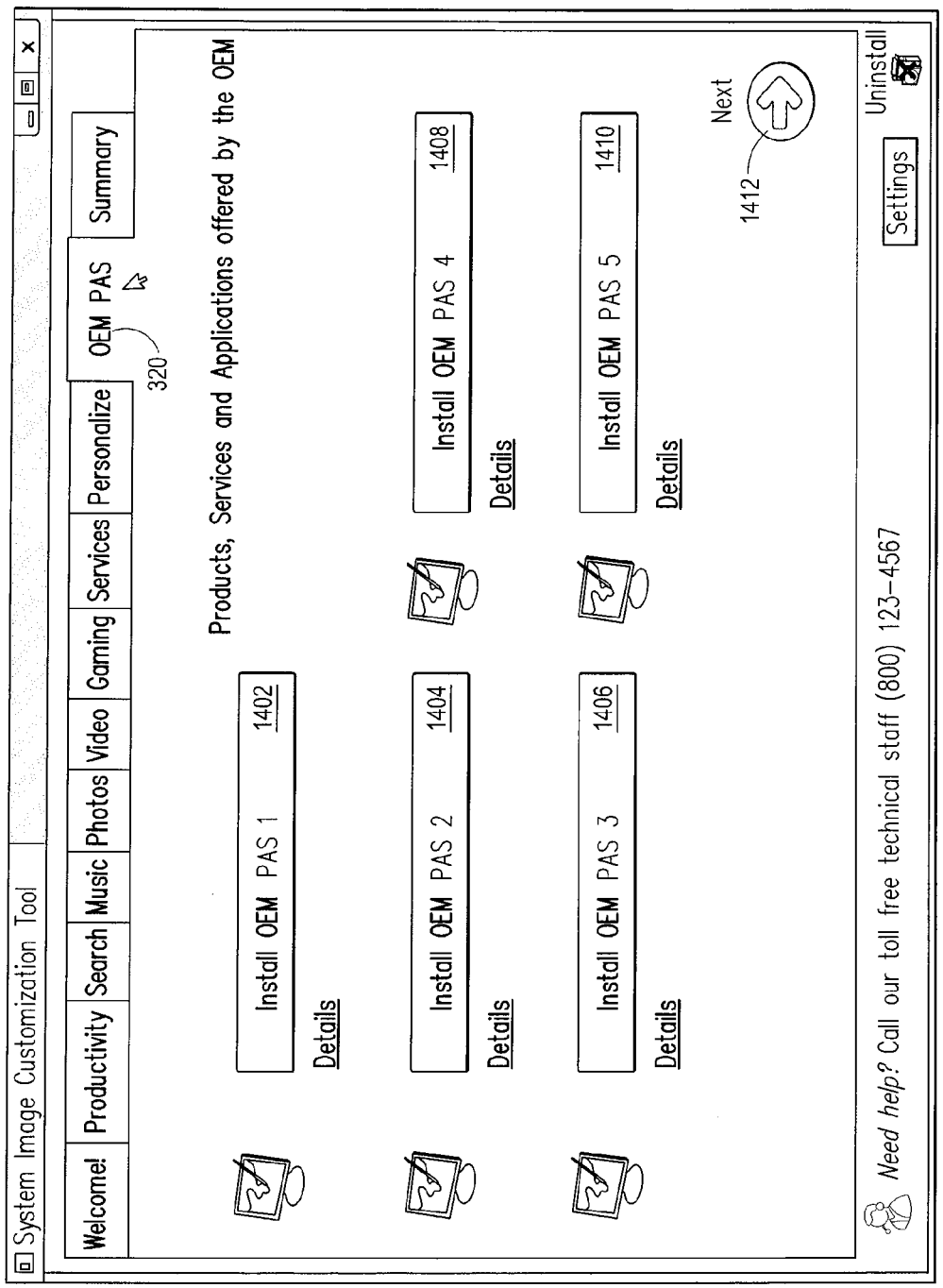
FIG. 14 shows an example of the ICT UI OEM category that the ICT UI displays.

FIG. 14 shows an example of the ICT UI OEM 1400 category that the ICT UI displays when the customer selects the OEM 320 category tab from the ICT UI 300. The ICT UI OEM 1400 category includes customer selectable OEM PAS objects (e.g. 1402, 1404, 1406, 1408 and 1410) that correspond to PAS for the SICI 126 to install. In one implementation, the OEM configures the digital device with hardware that the customer may purchase and configure through the ICT UI 300 in the same way the customer selects other PAS offerings from the digital shelf offering 128. In this way the OEM may deliver digital devices with an entire array of hardware capabilities available for purchase and configuration through the ICT UI OEM 1400 category after the original POS by the customer. Those hardware capabilities unselected by the customer remain unusable, tamper proof and may not be redeployed and/or installed in another device unless properly configured through the SICI 126.

Figure 15:
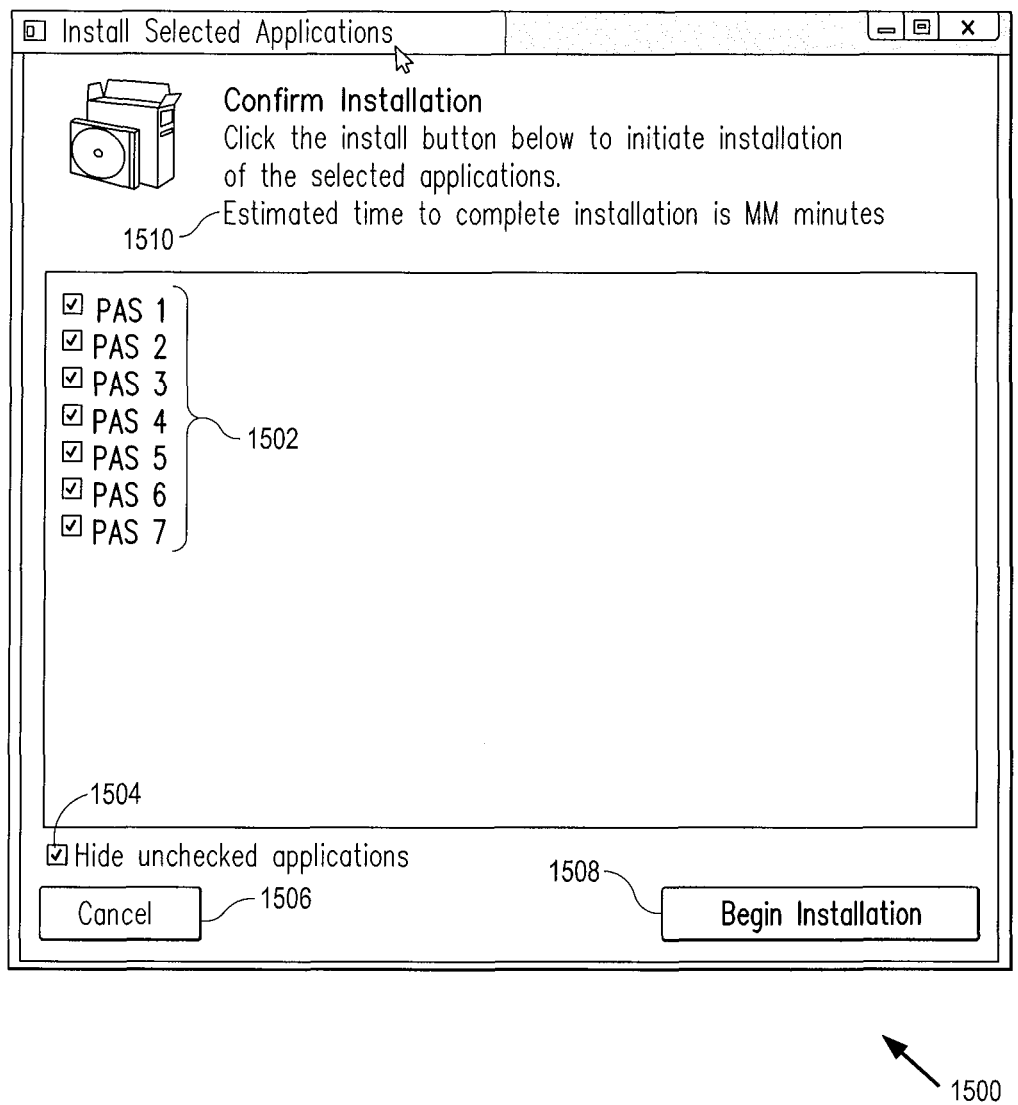
FIG. 15 shows an example PAS confirmation prompt that the ICT UI displays.

FIG. 15 shows an example PAS confirmation prompt 1500 that the ICT UI 300 displays, when the customer selects the next 1412 object from the ICT UI OEM 1400 category display. In one implementation, the PAS confirmation prompt 1500 displays a list of selected PAS (e.g., 1502) that the customer selected from the categories of digital shelf offerings 128 (e.g., productivity 304, search 306, music 308, photos 310, video 312, gaming 314, services 316, personalize 318, and OEM PAS 320). The PAS confirmation prompt 1500 may display a hide unchecked PAS 1504 that causes the PAS confirmation prompt 1500 to not display unchecked PAS selections in the list of selected PAS (e.g., 1502). When the customer selects the cancel 1506 object the SICI 126 displays the SICI welcome 302 display. When the customer selects the begin installation 1508 object the SICI 126 executes installation of the selected PAS (e.g., 1502). The PAS confirmation prompt 1500 may display the estimated time (e.g., 1510) to complete the installation of individual PAS from the list of selected PAS (e.g., 1502) and/or the estimated time to complete the batch installation of the list of selected PAS.

Figure 16:
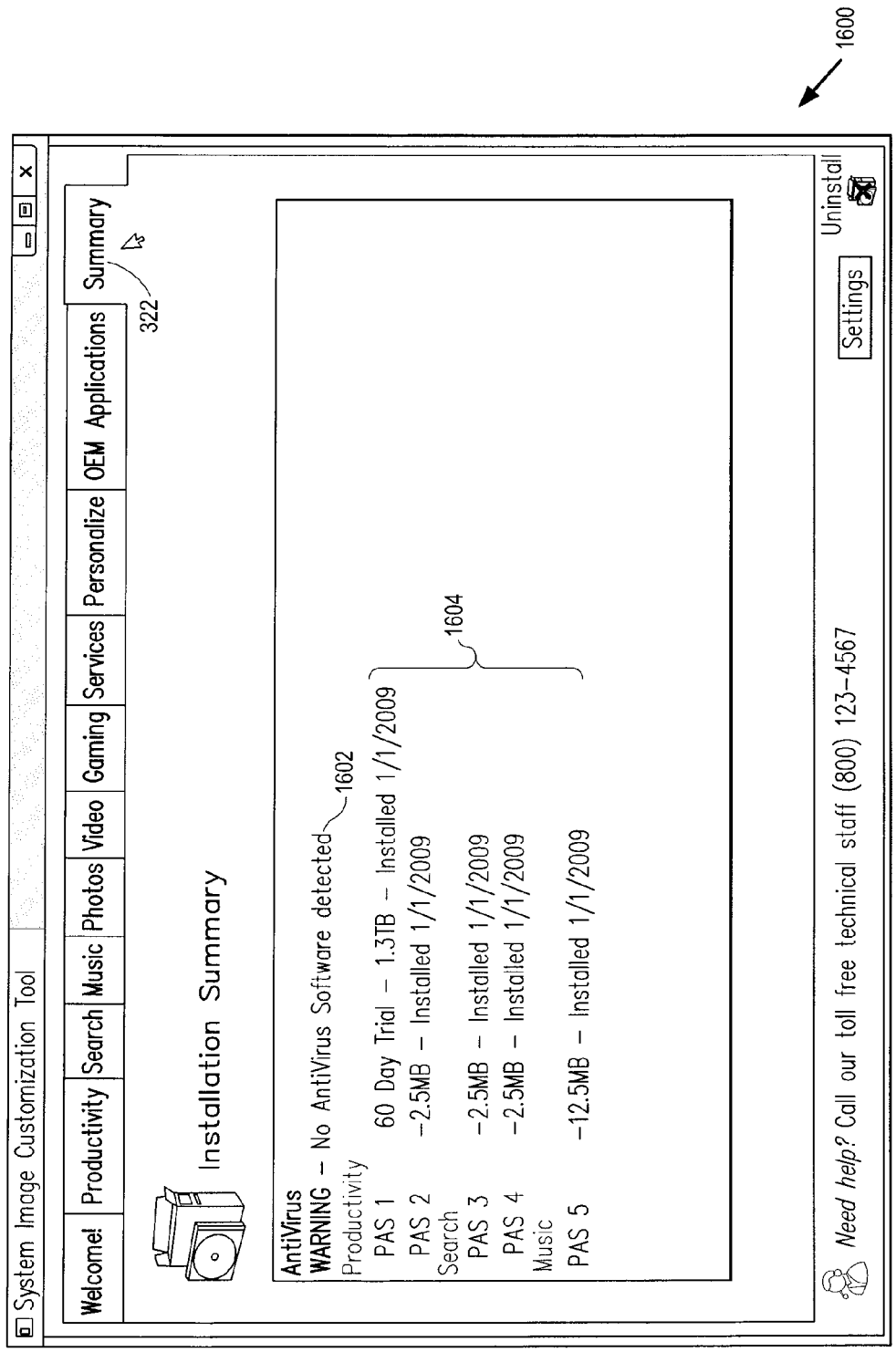
FIG. 16 shows an example ICT UI summary display that the ICT UI displays.

FIG. 16 shows an example ICT UI summary 1600 display that the ICT UI 300 may display when the SICI 126 completes the installation of the select PAS (e.g., 1502). The ICT UI summary 1600 display may display summary information 1602 and 1604 regarding each selected PAS (e.g., 1502) installed by the SICI 126.

Figure 17:
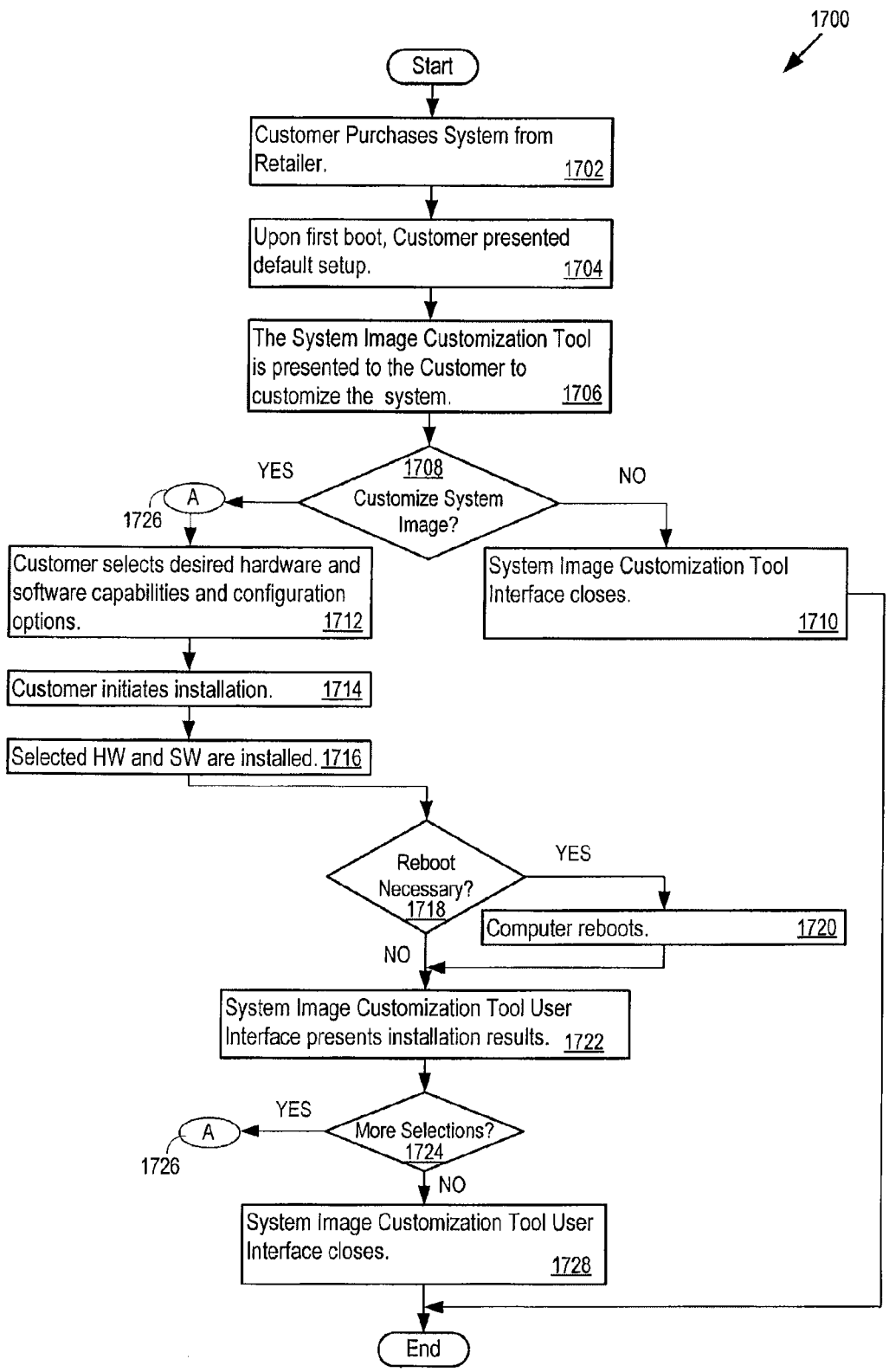
FIG. 17 illustrates the logic flow the system image customization instructions (SICI) may take to configure a digital device.

FIG. 17 illustrates the logic flow 1700 the system image customization instructions (SICI 126) may take to configure a customer's digital device. In one implementation, the customer may purchase the digital device from a retailer 114, where the retailer 114 has already preconfigured the device with the ICT (1702). When the customer first starts the device (e.g., the first OOBE), or whenever the customer turns the device on and has not previously completed the ICT, when requested by the customer, or at other selected times, the SICI 126 presents the customer the default setup and prompts the customer to select whether to start the SICI 126 to further customize the device (1704). When the customer chooses to use the SICI 126 to customize the device, the device displays the SICI welcome 302 to the customer (1706). When the customer chooses to not customize the system using the SICI 126 (1708) the SICI 126 closes (1710). When the customer chooses to uses the SICI 126 to customize the device, the SICI 126 displays digital shelf offerings 128 (e.g., productivity 304, search 306, music 308, photos 310, video 312, gaming 314, services 316, personalize 318, and OEM PAS 320) to the customer for selection and configuration options (1712) and the customer initiates execution of the installation of the selected PAS (1714). The SICI 126 installs and configures the PAS and hardware (1716) on the device. The SICI 126 determines whether to reboot the device in order to complete the installation and configuration of the selected PAS and hardware (1718) (1720). When the SICI 126 determines the device does not require a reboot to complete the installation and configuration of the selected PAS and hardware (1718) the SICI 126 displays the ICT UI summary 1600 display to the customer (1722). The customer may desire to install additional PAS (1726) or exit the SICI 126 when the SICI 126 completes the installation according to the customer's selections (1728).

Figure 18:
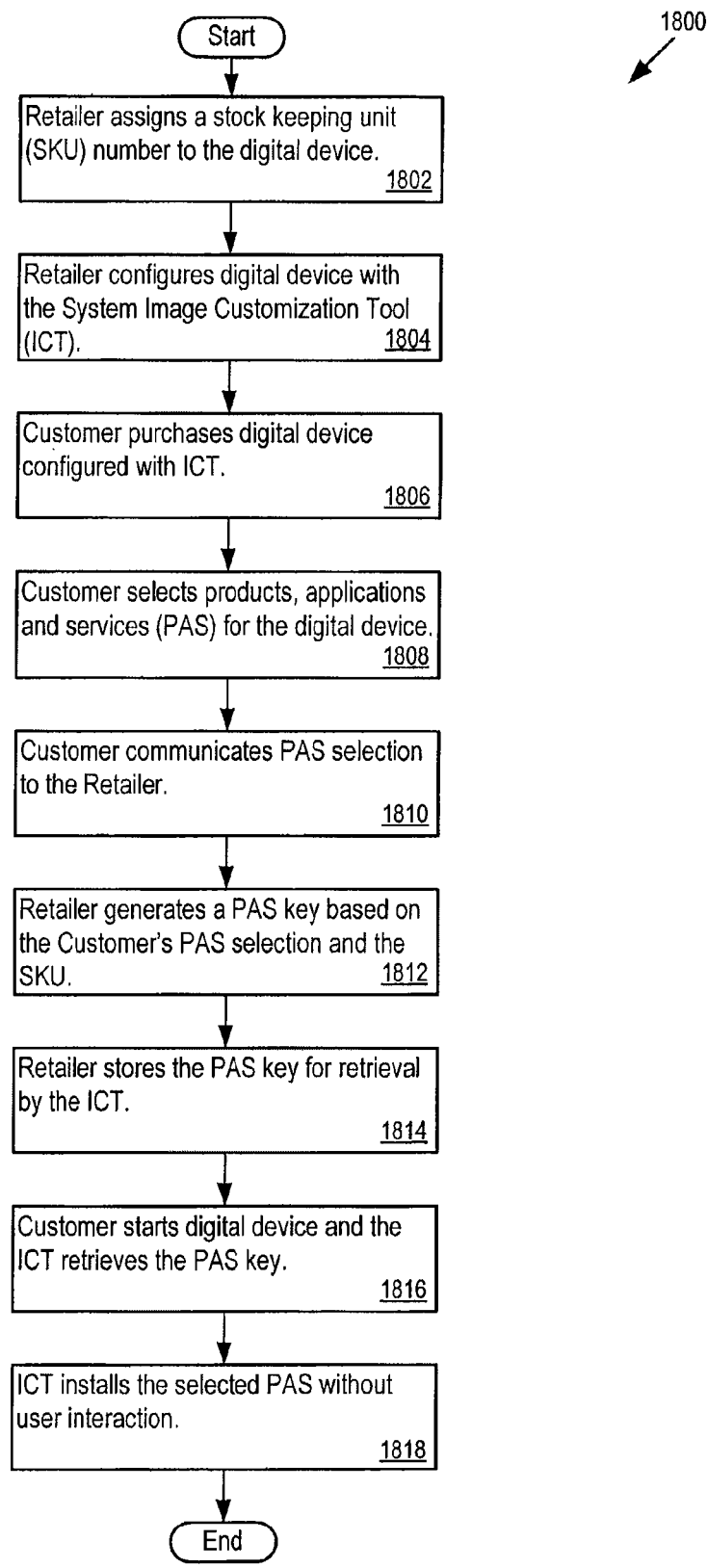
FIG. 18 illustrates additional logic flow the SICI may take to configure a digital device.

FIG. 18 illustrates the logic flow 1800 the system image customization instructions (SICI 126) may take to configure a customer's digital device using a stocking keeping unit (SKU) number 170 and PAS key 172. In one implementation, the retailer 114 may assign a SKU number 170 to a digital device configured with the ICT 123 components (e.g., ICT setup installer 124, SICI 126 and digital shelf offerings 128) (1802). The retailer 114 configures the digital device with the ICT 123 components (1804) and the customer purchases the digital device configured with the ICT 123 (186). The customer selects products, applications and services (PAS) for the digital device (1808). In one implementation, the customer may select the PAS in advance of the purchase of the digital device and communicate the PAS selections to the retailer 114 at the point of sale (POS) of the digital device to the customer (1810). The retailer 114 generates a PAS key 172 based on the customer's PAS selections and the SKU number 170 for the device (1812). The retailer 114 stores the PAS key 172 for retrieval by the SICI 126 (1814). The customer starts the device and the SICI 126 retrieves the PAS key 172 (1816) and the SICI 126 installs the selected PAS without customer interaction (1818).

The SICI 126 provides the customer with the choice of installing offerings selected by the customer (e.g., offerings added to a shopping cart) in a managed batch (e.g., multiple offerings selected for installation). In one implementation, the ICT 123 configures the bits to execute in a silent mode so that the bits install with default options and with minimal or no customer interaction. Under the managed install, the bits execute with minimal prompts in all UAC configuration and customer account combinations. The managed installation option may suppress reboots and provide progress updates through the SICI 126 user interface.

Alternatively, the SICI 126 provides the customer with the choice to install offerings in an unmanaged (e.g., "install it now") experience that causes the SICI 126 to initiate a "native" installer (e.g., unmanaged installer) for each offering. Under the unmanaged install, the SICI 126 initiates execution of each bit (e.g., an individual installation package for a product, application or service) as an unmanaged "native" installation. The native installer executes independent of the SICI 126, in a separate window (e.g., shell), and allows the customer to interactively configure the offering. In one implementation, the SICI 126 does not monitor the unmanaged installation. The unmanaged installer may execute without command line options, display the native installer's user interface, prompt the customer and otherwise operate as though the customer initiated the native installer from outside the SICI 126. Under the unmanaged install, the SICI 126 also defers the End User License Agreement (EULA) display and acceptance to the native installer.

In one implementation, the ICT 123 employs the Windows Management Instrumentation (WMI™) to manage data and operations on Windows-based operating systems. The SICI 126 may use WMI™ queries to determine the pre-existing applications configured on the device so that the SICI 126 do not attempt to install over the pre-existing applications. The ICT 123 employs a PAS manifest (e.g., a PAS manifest file) stored on the device that includes a list of the offerings (e.g., PAS) installed on the device. In one implementation, the setup installer 124 initially stores the PAS manifest on the device and the SICI 126 updates and maintains the PAS manifest as the customer selects digital offerings (e.g., PAS) throughout the lifecycle use of the device. The installation status of a digital offering may be unavailable for querying through the WMI™ (e.g., Internet Explorer™ shortcuts). When the installation status of a digital offering is unavailable the SICI 126 may consider the digital offering installed in the event the PAS manifest includes an entry for the successful installation of the offering. In one implementation, the PAS manifest includes other details, such as feedback information used by a feedback service discussed in detail below.

In one implementation, the SICI 126 does not disable non-digital shelf offerings 128 (e.g., products, applications and services previously installed on the device that the SICI 126 does not identify as included with the digital shelf offering 128). The SICI 126 allows the customer to select non-digital shelf offerings for installation, even though the non-digital shelf offerings may be previously installed on the device. The SICI 126 reports the non-digital shelf offerings as installed to a feedback service (discussed in detail below) in the event the PAS manifest includes an entry indicating the successful installation of the non-digital shelf offering, even in the event the non-digital shelf offering may not be installed at the time of the feedback. For example, in the event the PAS manifest includes an entry indicating the previous install of a desktop shortcut, but the shortcut was actually deleted by the customer after being installed, the desktop shortcut would report back to the feedback service as installed.

In one implementation, the SICI 126 employs the windows presentation foundation (WPF™) programming model and the Extensible Application Markup Language (XAML) to present the customer with a rich user interface (UI), media and documents. XAML includes native support for many different user interface concepts, such as 2-D and 3-D drawing, animations, control containment, control and document flow, as well as a rich data binding model to support a model for developing applications. The SICI 126 includes a status icon bound to the InstallationStatus property, which allows the ICT UI 300 to display visual indicators that indicate the installation progress for each offering installation. The SICI 126 combines the name and category properties to display in an offering label for each offering. In one implementation, the SICI 126 includes a progress fraction indicator bound to the sum(offerings in installation success or fail states)/(the total number of offerings being installed). The SICI 126 include a time remaining indicator bound to the sum(AverageInstallTime) for each of the offerings that the SICI 126 identifies as in NotInstalled or Installing states minus the time since the last item (e.g., offering install) completed. The SICI 126 may combine these properties into a ViewModel, based on the Model-View-ViewModel™ (MVVM) pattern, which exposes calculated values needed by ICT UI 300 for a shopping cart object of offerings.

The SICI 126 defines installation process specifics in install methods for each offering subclass (e.g., application offering class and desktop shortcut class). The SICI 126 includes an installation manager that leverages the offering install methods to perform the actual installation. The installation manager (e.g., InstallationManager class) provides common logic not specific to each offering installation implementation, and wraps each installation (e.g., such as serializing the installations, initializing each of the installation processes and updating the PAS manifest). The InstallationManager class manages the installation of each offering. The InstallationManager class performs the managed and unmanaged installations. The offering object defines an install method to call in order for the offering to install itself. The SICI 126 includes a status property to track the install progress of each offering. The status property may include the following status values: NotInstalled; Installing; SuccessfullyInstalled; and InstallFailed. After the installation of each offering, the SICI 126 updates the PAS manifest to reflect the installation of each offering.

Table 3 shows an example application offering class install method that may be generalized for the install methods for products and services as well offered under the digital shelf offering 128.

TABLE 3

Application Offering Class Install Method

```
Public override void Install(bool isManagedInstall)
{
    If(isManagedInstall)
    {
        This.InstallStatus = InstallationStatus.Installing;
        Try
        {
    Process installationProcess = Process.Start(InstallBitsPath, ManagedInstallFlags);
            installaitonProcess.WaitForExit( );
    //This is where the "0 exit code = success" assumption comes into play.
            If(installationProcess.ExitCode == 0)
            {
                This.InstallStatus = InstallationStatus.SuccessfullyInstalled;
            }
            Else
            {
                //log the failure code
                This.InstallStatus = InstallationStatus.InstallFailed;
            }
        }
        Catch
        {
            //log the exception
            This.InstallStatus = InstallationStatus.InstallFailed;
        }
    }
    Else
    {
        Try
        {
            Process.Start(InstallBitsPath);
        }
        Catch
        {
            //log the exception
        }
    }
}
```

Table 4 shows an example desktop offering class install method.

TABLE 4

Desktop Offering Class Install Method

```
Public override void Install(bool isManagedInstall)
{
    If(isManagedInstall)
    {
        try
        {
            InstallStatus = InstallationStatus.Installing;
            // Create a new instance of WshShellClass
            WshShell = new WshShellClass( );
            // Create the shortcut
            IWshExecutetimeLibrary.IWshShortcut MyShortcut;
            // Choose the path for the shortcut
            MyShortcut =
(IWshExecutetimeLibrary.IWshShortcut)WshShell.CreateShortcut
                (Environment.GetFolderPath(Environment.SpecialFolder.DesktopDirectory) +
ShortcutName + ".lnk");
            // Where the shortcut should point to
            MyShortcut.TargetPath = ShortcutTarget;
            // Description for the shortcut
            MyShortcut.Description = ShortDescription;
            // Location for the shortcut's icon
            MyShortcut.IconLocation = ShortcutTarget + @"\app.ico";
            // Create the shortcut at the given path
```

TABLE 4-continued

Desktop Offering Class Install Method

```
                MyShortcut.Save( );
                InstallStatus = InstallationStatus.SuccessfullyInstalled;
            }
            Catch
            {
                //log exception
                InstallStatus = InstallationStatus.InstallFailed;
            }
        }
    }
    Else
    {
        try
        {
            // Create a new instance of WshShellClass
            WshShell = new WshShellClass( );
            // Create the shortcut
            IWshExecutetimeLibrary.IWshShortcut MyShortcut;
            // Choose the path for the shortcut
            MyShortcut =
(IWshExecutetimeLibrary.IWshShortcut)WshShell.CreateShortcut
    (Environment.GetFolderPath(Environment.SpecialFolder.DesktopDirectory) +
ShortcutName + ".lnk");
            // Where the shortcut should point to
            MyShortcut.TargetPath = ShortcutTarget;
            // Description for the shortcut
            MyShortcut.Description = ShortDescription;
            // Location for the shortcut's icon
            MyShortcut.IconLocation = ShortcutTarget + @"\app.ico";
            // Create the shortcut at the given path
            MyShortcut.Save( );
        }
        Catch
        {
            //log exception
        }
    }
}
```

In one implementation, the SICI 126 presents a Microsoft™ setup screen that is not changed by the first out of box experience (OOBE) for the customer. The SICI 126 controls the messaging and windows presented to the customer during the OOBE. The SICI 126 displays a retailer 114 welcome screen to the customer. The welcome screen explains that the SICI 126 will lead the customer through an extended setup process for the digital device. The SICI 126 welcome UI presents the customer a description and purpose for the SICI 126 process. In a visually engaging way, the SICI 126 description and purpose provide the customer with information necessary for the customer to determine the value and intended benefits expected for the customer as a result of performing the extended setup process.

In one implementation, when the customer starts the device the setup screens (e.g., Microsoft™ setup screens) may prompt the customer for a username, a password, and regional information, and the device boots and presents the customer with the desktop (e.g., MS-Windows™). In one implementation, two windows open when the customer starts the device, for example, a welcome screen and a window where the SICI 126 executes. The welcome screen is suppressed by the SICI 126 and the SICI 126 suppresses unnecessary icons so that the device presents the customer with a clean desktop, (e.g., no icons on the desktop other than the recycle bin). The SICI 126 may also allow the clock gadget to install and be visible (e.g., MS-Windows™ default) to the customer. The ICT setup installer 124 may permit hardware specific applications installed by the OEM (e.g., special button drivers) to execute. The ICT setup installer 124 may configure a retailer 114 version of one or more PAS that the OEMs pre-install on the device.

The SICI 126 includes a welcome screen with a welcome video and written description of the SICI 126 functions. The SICI welcome screen provides an introduction and explanation of each category of digital shelf offering 128 (e.g., productivity, search, music, photos, video, gaming, services, personalize, and OEM applications). In one implementation, the SICI 126 employs the windows presentation foundation (WPF™) programming model to present the customer with a rich user interface (UI), media and documents. The SICI 126 presents vendor specific PAS icons and animations and transitions. Each PAS offered with the digital shelf offerings 128 may include video presentations and/or other multimedia presentations. The customer may choose to uninstall the SICI 126 and/or exit the SICI 126 from the welcome screen. In the event the customer chooses to close the SICI 126 without uninstalling the SICI 126, the SICI 126 will remain available for execution from the start menu and/or a desktop shortcut, and the control panel for uninstall. In the event the customer exits or uninstalls the SICI 126 without clicking a first entry button, the SICI 126 may prompt the customer with an explanation and/or warning message to confirm the customer's decision. The customer may bypass (e.g., exit) the personalization process and return to the SICI 126 at a later time, by selecting the exit SICI 126 button. The SICI 126 presents the customer with configuration options to customize the desktop including desktop themes and custom desktop backgrounds.

In one implementation, the SICI 126 provides two modes for viewing the ICT UI 300 including browse view mode and view all mode. In the browse mode, the ICT UI 300 displays offerings and corresponding videos by category when the customer selects one of the various categories. In the view all mode, all offerings may be presented in the ICT UI 300 simultaneously. The ICT UI 300 may provide detailed information to the customer when the customer hovers over an offering with a pointing device. The customer may add offerings to a shopping cart in both the browser mode and the view all mode. The ICT UI 300 includes a description for each offering (e.g., PAS) within a category. The SICI 126 prompts the customer to confirm whether the customer already has the application when the customer attempts to add a PAS to the customer's shopping cart. The SICI 126 presents the customer with a "favorites" category, where the ICT UI 300 presents a list box to the customer from which the customer may choose favorites to add to the browser (e.g., internet Explorer™ (IE)). The OEM tab presents the device manufacturer's PAS as offerings. In one implementation, the SICI 126 does not include the OEM offerings with the batch installation process, and OEM offerings may be available in the browse mode. The ICT UI 300 may present the customer with the default PAS that are bundled with the operating system (e.g., Vista™ defaults such as Windows Media Player™ and IE™). For example, under the music and movie categories, the category description may indicate that Windows Media Player™ is already installed as a consequence of the operating system (e.g., Vista™) previously being installed on the device. In one implementation, the OEM may install a term limited anti-virus/anti-spam (AV/AS) PAS (e.g., first 30 days free PAS). In another implementation, the SICI 126 does not install or monitor AV/AS PAS. The SICI 126 may present an estimated time to complete the install of each PAS and the estimated time to complete the install of the batch of PAS. The ICT UI 300 presents the customer with basic personalization options such as antivirus and anti-spam (AV/AS), browser, search engine, and toolbar, as well as more elaborate personalization options. In one implementation, the SICI 126 prevents the customer from selecting an AV/AS for install through the ICT UI 300 when the SICI 126 determines an AV/AS is already installed.

In one implementation, the ICT UI 300 presents the customer with an automated installation option for offerings (e.g., PAS) from various vendors that provide a silent packaged installer that does not include customer prompts for the customer to click through. Under the automated installation option, the SICI 126 may present the customer with the option to choose from a list of AV/AS trial PAS. The ICT UI 300 presents a shopping cart and a checkout screen for the customer to review and confirm PAS selections. In one implementation, the customer provides account information during the shopping cart checkout so that when the SICI 126 starts the install of the select offerings SICI 126 submits payment to the PAS providers for selected offerings during the install process without further customer interaction. Under the automated installation option, when the customer completes the selection of offerings, the customer initiates the installation of the selected PAS and the SICI 126 installs the selected PAS without prompting the customer. The SICI 126 maintains the customer's PAS selections so that in the event the shopping process is interrupted when the customer resumes SICI 126 the customer can view previously selected offerings and resume selection of additional offerings. The SICI 126 provides an installation log the customer may view during and/or after installation of the selected offerings.

The ICT UI 300 presents the customer with a batch end user license agreement (EULA) when the customer selects the "install" button on a "review and install screen". The SICI 126 displays the EULA in a scrollable text area that contains the EULAs for the selected offerings. The SICI 126 presents the customer with the option to accept or decline the EULAs. In the event the customer accepts the EULAs, the SICI 126 initiates installation of the offerings. In one implementation, selecting the accept option indicates that the customer accepts all the EULAs for the selected offerings, so that in the event the customer does not select the accept option, the SICI 126 presents the "review and install screen" to the customer so that the customer may deselect those offerings for which the customer did not choose to accept the EULAs.

In one implementation, the SICI 126 presents the customer with a custom installation option and install buttons for each offering selected. In the event the offering supports a native installation, the SICI 126 presents the customer with the option to launch the native installer by clicking on an "install now" button. In one implementation, the "install now" button may be located in a "hover bubble" in the view all mode. When the customer launches a native installer, the SICI 126 may no longer be the customer focus.

The SICI 126 may detect whether an AV/AS product is already installed on the computer. The SICI 126 may prevent a customer from installing an AV/AS product when the SICI 126 detects that the AV/AS is already installed. In one implementation, when the SICI 126 starts the SICI 126 performs a check of the device and in the event the AV/AS is detected, the SICI 126 may not present the AV/AS category to the customer. In one implementation, each offering (e.g., PAS) may be identified by a unique retailer 114 identifier that the SICI 126 communicates to the PAS vendors to confirm that the offering was installed from the SICI 126.

In one implementation, each offering may reside in a hidden directory and/or compressed (e.g., cabinet file format—CAB™) to prevent installation and use of the offerings unless installed through the SICI 126. In another implementation, the SICI 126 removes the AV/AS offerings after an AV/AS offering is installed. In one implementation, the SICI 126 may be certified by the operating system (OS) vendor (e.g., Microsoft™) for distribution with the OS by the OEM of the device. The retailer 114, OEM and/or technical staff of the retailer 114, and the customer may configure the SICI 126 with a culture and language option so that the SICI 126 presents ICT UI 300 for a particular culture, languages and dialectics. The SICI 126 may use satellite assemblies and resource files to implement the culture and language option. In one implementation, the SICI 126 presents offerings compatible with hardware and anti-virus PAS from market leader vendors (e.g., Asus™ and TrendMicro™) in order to minimize compatibility and integration issues between and among the ICT 123 components, the devices and the digital shelf offerings 128 (e.g., PAS). The SICI 126 and digital offering shelf may be deployable via a packaged installer and the SICI 126 may be downloadable from the Internet.

The SICI 126 captures and stores in a PAS manifest file the customer selected offerings so the information can be communicated to the retailer 114 and/or PAS providers, and utilized by the SICI 126 when the customer executes the SICI 126 on subsequent occasions. The SICI 126 may communicate device information (make/model, software build, MAC address, serial no.) to the retailer 114, and/or the OEM of the device and PAS providers (e.g., PAS vendors). In one implementation, the SICI 126 may collect only non-personal information. The SICI 126 may inform the customer of the automated feedback service and provide the customer with the option to opt-out of providing the feedback information. The SICI 126 may provide the customer with a disclaimer that notifies the customer that the SICI 126 captures offering selections to send back to the retailer 114. The SICI 126 stores the feedback information locally and may send the feedback information to the retailer 114 and/or feedback service when the SICI 126 closes.

The retailer 114 may assign a stock keeping unit (SKU) number 170 to each device that indicates the device is configured with the ICT 123 (e.g., ICT setup installer 124, the SICI 126, and digital shelf offerings 128). In one implementation, at the point of sale (POS) of the device by the retailer 114 to the customer, the retailer 114 generates a PAS key 172 based on the customer's PAS selections and the SKU number 170 so that when the customer first starts the device (e.g., the first OOBE) the device retrieves the PAS selections and installs the selected PAS without customer interaction. For example, the customer purchases a device from a retailer 114 and communicates PAS selections to the retailer 114 at the POS of the device, which the retailer 114 uses to generate the PAS key 172, prior to the customer's first OOBE with the device. The retailer 114 stores the PAS key 172 in a location for the SICI 126 to retrieve, such as a website, and/or a universal serial bus (USB) memory stick and/or an RFID embedded receipt the retailer 114 gives to the customer at the POS of the device. In one implementation, the retailer 114 communicates the PAS key 172 to a customer designated location (e.g., a PDA and email account) and the SICI 126 configured device retrieves the PAS key 172 via wireless communication (e.g., Bluetooth and Wi-Fi) from the customer designated location. When the customer starts the device (e.g., the first OOBE with the device) the SICI 126 retrieves the PAS key 172 based on the SKU number 170 and installs the selected PAS without customer interaction. In one implementation, the customer may select PAS for install without purchasing the selected PAS during the POS of the device, but the customer may authorize the SICI 126 to use account information provided to the retailer 114 during the POS of the device to also submit payment for selected PAS during the installation performed by the SICI 126. The SICI 126 may retrieve the account information with the PAS key 172. In another implementation, the customer provides the retailer 114 with information for multiple accounts during the POS of the device and the customer authorizes the SICI 126 to use individual and/or combinations of accounts from which to submit payments for the selected PAS.

The SICI 126 may provide a revenue recognition report to the retailer 114 that the retailer 114 may use to account to the various OEMs, and PAS vendors of the digital shelf offerings 128. The SICI 126 provides a reconciliation report to the retailer 114 so that the number of devices configured with the digital shelf offerings 128 and the number of offerings installed by the customers of the device reconcile. The feedback service provides logging and exception handling reports (e.g., Enterprise Library™ 4.0).

The SICI 126 detects whether the device is connected to the internet, and upon startup, checks for updates of the SICI 126 and the digital shelf offerings 128. In the event the SICI 126 detects available updates, the customer may be prompted. The ICT UI 300 may prompt the customer to confirm whether to install the updates. In the event the customer elects to install the updates, SICI 126 downloads and installs the updates, shuts down, and then the SICI 126 restarts.

In one implementation, the SICI 126 comprises a feedback service that provides a mechanism for the SICI 126 to communicate feedback information about the customer's experience with the device, the SICI 126 and the digital shelf offerings 128 selected by the customer. The customer may "opt-in" in order for the feedback information to be communicated to the retailer 114. The feedback information may include device specifications as well as a listing of the digital shelf offerings 128 installed by the SICI 126. In one implementation, the feedback service is a .NET 3.5 WCF™ Service hosted in internet information services (IIS). The SICI 126 may use a WCF™ proxy class to communicate with the WCF™ service using the service oriented architecture protocol (SOAP) over hypertext transfer protocol (HTTP).

A feedback database 178 (e.g., MS-SQL Server™) may be used to store the feedback information on a server. In one implementation, the feedback database 178 includes a schema definition, tables and data context information to store feedback information. The feedback information stored in the feedback database 178 may include information about the offerings installed on the customer's device, details about the customer's device, customer favorites, and logging information for errors and installation information.

In one implementation, the feedback service uses Entity Framework™ to communicate with the feedback database 178. Entity Framework™ implements a data access layer that contains three layers including storage metadata schema (SSDL), conceptual schema (CSDL) and C-S mapping. The feedback service may employ the language integrated query (LINQ™) to entity feature of Entity Framework™ to perform create, read, update and delete (CRUD) operations, and wrap the CRUD operations into a separate class inside the service assembly. Entity Framework™ may expose the feedback database 178 as an object relational mapping (ORM) (e.g., a virtual object database).

The feedback service employs a feedback save method that saves feedback information in the feedback database 178. In one implementation, the feedback save method creates a connection to the feedback database 178 for each customer device executing the SICI 126, and performs database operations for a feedback service request under a single transaction. The feedback save method may check each request for SQL injection and reject a request in the event the feedback save method identifies SQL injection. In the event the feedback save method identifies the feedback information as originating from a same client (e.g., customer), the feedback save method clears the previously stored feedback information and then inserts the new feedback information. Before saving feedback information to the feedback database 178, the feedback save method may validate the feedback information. The feedback service determines whether the feedback service request includes device information for the customer's device (e.g., client PC) and obtains the IP address of the client PC. The feedback service may use the IP address to detect repeated feedback requests from the same client PC. In the event the feedback service determines that the number of feedback requests have exceeded a configurable threshold number, the feedback service may ignore further feedback requests from the particular IP address for a configurable period of time (e.g., 24 hours). In the event the feedback service identifies an error during a transaction, the feedback service may throw an exception, rollback the transaction and log the exception details.

In one implementation, the feedback service uses DataContext object to perform CRUD operations for LINQ to SQL. DataContext object may be configured to retrieve objects from the feedback database 178 and submits changes to the feedback database 178. The feedback service exposes entity classes (e.g., machine—customer's device, offering, favorite, OfferingMachine, error log) as properties to DataContext on which CRUD operations are performed. For each feedback request a DataContext object may be created at method scope. CRUD operations may be performed in a single transaction in order to keep the data consistent. In the event an operation completes successfully then the feedback database 178 commits the feedback information, but in the event the operation fails the feedback database 178 rolls back the feedback information. When a CRUD operation completes successfully the feedback service releases the DataContext object.

In one implementation, the feedback request comprises device information that identifies the customer's device (e.g., target system) and configuration, selected offerings configured on the customer's device, favorites (e.g., URIs and URLs), desktop shortcuts, and feedback error information. The device information may include an operating system product identifier (e.g., MS-Windows™ product identifier) used to uniquely identifier the customer's device, the serial number of the device (e.g., and/or SKU number 170), the time zone settings for the device, the language and cultural settings configured for the device, the keyboard setting and keyboard type, the country settings to use for the customer, operating system version number (e.g., MS-Windows™), operating system edition (e.g., MS-Windows™ Home Edition), the number of times the SICI 126 executes prior to the feedback service communicating feedback information to the feedback server, and the version number of the SICI 126 (e.g., and/or ICT 123 components). The device information may further include the RAM size of the customer's device, total size of physical hard disk, the CPU architecture (e.g., x86 32 bit and x64 64 bit), the total number of CPU's on the customer's device, the number of core per CPU (e.g., 2 cores and 4 cores), the clock speed of the CPU(s), the MAC address, the IP address, and operating system architecture (e.g., 32 bits and 64 bits).

In one implementation, the feedback information includes information about the selected offerings, including a PAS identifier that identifies each selected offering, the version number of each selected offering, the frequency of use by the customer of each selected offering, the date and time of installation of each selected offering, and the amount of disk space occupied by each selected offering. The feedback information may include feedback error information such as an error code that uniquely identifies the feedback error, a description of the feedback error, an error source identifier that identifies the source of the feedback error (e.g., the SICI 126 and the selected offering installed through the SICI 126), the date the feedback error occurred, and a PAS error identifier that identifies the selected offering to which the feedback error relates.

The feedback information may identify the favorites (e.g., URIs—uniform record identifiers and URLs—uniform record locators) configured for the customer's device, including a URI, offering identifier and a date of installation of the favorite. The feedback information may identify the desktop shortcuts configured for the customer's device, including a desktop shortcut name, desktop shortcut offering identifier for a corresponding offering, the date of installation of the desktop shortcut, the disk space occupied by the desktop shortcut, and the elapse time to install the desktop shortcut and/or the elapse time to install the offering to which the desktop shortcut corresponds. The feedback service may include a feedback response to a feedback request, where the feedback response includes a feedback request status and a description of the feedback information.

In one implementation, the feedback service includes a feedback frequency limit (e.g., no more than 5 times per day, per hour and/or per month). The feedback service may evaluate the feedback service communicates feedback information to the feedback service and the date on which the feedback service communicated the feedback information to determine whether to communicate additional feedback information within a particular period of time (e.g., hour, day, month). The feedback service may maintain a feedback last updated time property that indicates the last time the feedback service communicated feedback information from the customer to the feedback database 178. The feedback service may also limit the frequency (e.g., hours, days, months) and the maximum number of times (e.g., twice per month and no more than once per day) that the feedback service communicates feedback information to the feedback database 178.

In one implementation, the feedback service considers the customers as anonymous and accepts anonymous web service requests. The feedback service encrypts the feedback information to protect the privacy of the customer. The feedback information comprises non-personal information, installed offerings, and error information. The feedback service comprises a security model design that protects the feedback information from attackers that may attempt to compromise the feedback service. The security model of the feedback service addresses threats and vulnerabilities to the feedback service including: access to non-personal information; unauthorized access to the feedback service; unwanted, erroneous, and malicious data being entered into the feedback database 178 that may invalidate the integrity of the feedback database 178; choking the feedback service by endless looped requests; unauthorized listener on the transport level; and unauthorized communication interceptors.

The feedback service may be secured using a security web service (e.g., WS* Security™) to ensure that the feedback service securely communicates feedback service message contents. In one implementation, the feedback service uses wsHttpBinding class with an encryption algorithm that ensures that the feedback service communicates the feedback information securely. The feedback service relies on the ws-* standard based ws-policy and ws-security. In one implementation, the identity and resource access of a feedback request and the feedback service is based upon a trusted sub-system model, whereby the feedback service employs an application pool account configured as a least privileged customer account with permissions to update the feedback database 178 and write log files to a folder on a feedback server (e.g., a web server). The feedback service may also be configured to prevent the feedback service from impersonating a requester identity.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification. In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various machines.

Selected aspects, features, and components of the implementations described above are depicted as stored in memories. However, all or part of the systems, including logic (such as computer executable instructions) for implementing the methods, may be stored on, distributed across, or read from a wide variety of machine or computer-readable media. The media may include storage devices such as hard disks, flash memory, floppy disks, and CD-ROMs, or other forms of ROM or RAM either currently known or later developed. The logic may also be encoded in a transitory or non-transitory signal that encoded the logic as the signal propagates from a source to a destination.

The logic that implements the system may include any combination of hardware and software, which may vary widely in implementation. For example, a processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The functionality of the system may be distributed among multiple computer systems. Parameters, databases, and other data structures may be separately stored and managed, may be incorporated into a single memory or database, or may be logically and physically organized in many different ways. Any of the logic described may be implemented with programs that are parts of a single program, as separate programs, or distributed across several memories and processors. The logic may be organized into software libraries, including dynamic link libraries (DLLs), application programming interfaces (APIs), or other libraries.

What is claimed:

1. An article of manufacture, comprising:
   a non-transitory computer readable medium; and
   setup installer instructions stored on the medium that when executed by a processor coupled to a memory of a target system cause the processor to:
   set an execution privilege for the target system to execute administrative tasks without security exceptions and prevent the target system from issuing user prompts during program installation;
   identify digital shelf offerings available from a digital shelf offering provider for installation on the target system;
   receive, from a user of the target system, a selection of a digital shelf offering from the digital shelf offerings and a designated location to communicate a digital shelf offering key;
   send to the digital shelf offering provider the offering selection of the selected digital shelf offering among the digital shelf offerings;
   retrieve, from the designated location, the digital shelf offering key for the selected digital shelf offering, wherein the digital shelf offering key is generated by the digital shelf offering provider based on the offering selection; and
   initiate installation of the selected digital shelf offering without issuing user prompts during the installation.

2. The article of manufacture of claim 1, wherein the setup installer instructions cause the processor to:
   display on a graphical user interface of the target system a digital shelf offering display listing the digital shelf offerings; and
   obtain the offering selection from a user of the target system through the graphical user interface.

3. The article of manufacture of claim 1, wherein the setup installer instructions cause the processor to:
   set the execution privilege upon startup of the target system.

4. The article of manufacture of claim 1, wherein the digital shelf offering key of the selected digital shelf offering is received by the target system without user interaction with the target system, and wherein the setup installer instructions cause the processor to:
   receive the digital shelf offering key that specifies the offering selection, wherein the offering selection is based on a user profile of the end-user, a target system identifier that identifies the target system, a particular location of the target system, or any combination thereof.

5. The article of manufacture of claim 1, wherein the user prompts comprise user target system security prompts.

6. The article of manufacture of claim 1, wherein the setup installer instructions further cause the processor to:
   suppress reboots by the target system during the installation of the selected digital shelf offering.

7. The article of manufacture of claim 4, wherein the setup installer instructions further cause the processor to:
   receive the digital shelf offering key by communicating with a source of the digital shelf offering key, wherein the source is identified by the user profile of the end-user pre-stored in the target system, the target system identifier pre-stored, the particular location of the target system, or any combination thereof.

8. A system comprising:
   a processor coupled to a memory, the memory comprising:
   setup installer instructions executable by the processor that when executed by the processor cause the processor to:
   set an execution privilege for the system to execute administrative tasks without security exceptions and prevent the system from issuing user prompts during program installation;
   identify digital shelf offerings available from a digital shelf offering provider for installation on the target system;
   receive, from a user of the target system, a selection of a digital shelf offering from the digital shelf offerings and a designated location to communicate a digital shelf offering key;
   send to the digital shelf offering provider the offering selection of the selected digital shelf offering among the digital shelf offerings;
   retrieve, from the designated location, the digital shelf offering key for the selected digital offering, wherein the digital shelf offering key is generated by the digital shelf offering provider based on the offering selection; and
   initiate installation of the selected digital shelf offering without issuing user prompts during the installation.

9. The system of claim 8, wherein the setup installer instructions cause the processor to:
   display on a graphical user interface of the system a digital shelf offering display listing the digital shelf offerings; and
   obtain the offering selection from a user of the target system through the graphical user interface.

10. The system of claim 8, wherein the setup installer instructions cause the processor to:
    set the execution privilege upon startup of the system.

11. The system of claim 8, wherein the digital shelf offering key of the selected digital shelf offering is received by the target system without user interaction with the target system, and wherein the setup installer instructions cause the processor to:
    receive the digital shelf offering key that specifies the offering selection, wherein the offering selection is based on a user profile of the end-user, a target system identifier that identifies the target system, a particular location of the target system, or any combination thereof.

12. The system of claim 8, wherein the user prompts comprise user target system security prompts.

13. The system of claim 8, wherein the setup installer instructions further cause the processor to:
    suppress reboots by the target system during the installation of the selected digital shelf offering.

14. The system of claim 8, wherein the setup installer instructions further cause the processor to:

receive the digital shelf offering key by communicating with a source of the digital shelf offering key, wherein the source is identified by the user profile of the end-user pre-stored in the target system, the target system identifier pre-stored, the particular location of the target system, or any combination thereof.

15. A method comprising:

storing setup installer instructions in a memory coupled to a processor, the setup install instructions executable by the processor cause the processor to:

set an execution privilege for a target system to execute administrative tasks without security exceptions and prevent the target system from issuing user prompts during program installation;

identify digital shelf offerings that is available from a digital shelf offering provider for installation on the target system;

receive, from a user of the target system, a selection of a digital shelf offering from the digital shelf offerings and a designated location to communicate a digital shelf offering key;

send to the digital shelf offering provider the offering selection of the selected digital shelf offering among the digital shelf offerings;

retrieve, from the designated location, the digital shelf offering key associated with the selected digital offering, wherein the digital shelf offering key is generated by the digital shelf offering provider based on the offering selection; and initiate installation of the selected digital shelf offering without issuing user prompts during the installation.

16. The method of claim 15, wherein the setup installer instructions cause the processor to:

display on a graphical user interface of the target system a digital shelf offering display listing the digital shelf offerings; and obtain the offering selection from a user of the target system through the graphical user interface.

17. The method of claim 15, wherein the setup installer instructions cause the processor to:

set the execution privilege upon startup of the target system.

18. The method of claim 15, wherein the digital shelf offering key of the selected digital shelf offering is received by the target system without user interaction with the target system, and wherein the setup installer instructions cause the processor to:

receive the digital shelf offering key that specifies the offering selection, wherein the offering selection is based on a user profile of the end-user, a target system identifier that identifies the target system, a particular location of the target system, or any combination thereof.

19. The method of claim 15, wherein the user prompts comprise user target system security prompts.

20. The method of claim 15, where the setup installer instructions further cause the processor to:

suppress reboots by the target system during the installation of the selected digital shelf offering.

21. The method of claim 15, wherein the setup installer instructions further cause the processor to:

receive the digital shelf offering key by communicating with a source of the digital shelf offering key, wherein the source is identified by the user profile of the end-user pre-stored in the target system, the target system identifier pre-stored, the particular location of the target system, or any combination thereof.

* * * * *